US012718998B2

(12) United States Patent
Kawada

(10) Patent No.: US 12,718,998 B2
(45) Date of Patent: Aug. 25, 2026

(54) VACUUM INTERRUPTER

(71) Applicant: Mitsubishi Electric Corporation, Tokyo (JP)

(72) Inventor: Masashi Kawada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 298 days.

(21) Appl. No.: 18/559,137

(22) PCT Filed: Jan. 28, 2022

(86) PCT No.: PCT/JP2022/003316
§ 371 (c)(1),
(2) Date: Nov. 6, 2023

(87) PCT Pub. No.: WO2023/276217
PCT Pub. Date: Jan. 5, 2023

(65) Prior Publication Data

US 2024/0234059 A1 Jul. 11, 2024

(30) Foreign Application Priority Data

Jun. 29, 2021 (JP) ................................ 2021-107242

(51) Int. Cl.
*H01H 33/664* (2006.01)
*H01H 33/662* (2006.01)

(52) U.S. Cl.
CPC .... *H01H 33/664* (2013.01); *H01H 33/66207* (2013.01)

(58) Field of Classification Search
CPC ........... H01H 33/664; H01H 33/66207; H01H 33/6644; H01H 33/6643; H01H 33/6641;
(Continued)

(56) References Cited

U.S. PATENT DOCUMENTS 4,430,536 A * 2/1984 Kurosawa .......... H01H 33/6644 218/127
5,438,174 A 8/1995 Slade
(Continued)

FOREIGN PATENT DOCUMENTS

JP S63236228 A 10/1988
JP H087723 A 1/1996
(Continued)

OTHER PUBLICATIONS

International Search Report (PCT/ISA/210) with translation and Written Opinion (PCT/ISA/237) mailed on Apr. 19, 2022, by the Japanese Patent Office as the International Searching Authority for International Application No. PCT/JP2022/003316. (10 pages).
(Continued)

*Primary Examiner* — William A Bolton
(74) *Attorney, Agent, or Firm* — BUCHANAN, INGERSOLL & ROONEY PC

(57) ABSTRACT

A fixed side power feeding plate having a fixed side circular arc shaped power feeding portion, a fixed side coil electrode having a fixed side circular arc shaped coil portion, a movable side power feeding plate having a movable side circular arc shaped power feeding portion, wherein a fixed side cavity is formed between a fixed side contact and the fixed side circular arc shaped power feeding portion, a movable side cavity is formed between a movable side contact and the movable side circular arc shaped power feeding portion, a fixed side air gap is formed between the fixed side circular arc shaped coil portion and the fixed side circular arc shaped power feeding portion, and a movable side air gap is formed between the movable side circular arc shaped coil portion and the movable side circular arc shaped power feeding portion.

20 Claims, 12 Drawing Sheets

(58) Field of Classification Search
CPC ........... H01H 33/6642; H01H 33/6645; H01H 33/6646
USPC ......... 218/139, 123, 126, 127, 18, 129, 138, 218/140, 141
See application file for complete search history.

(56) References Cited

U.S. PATENT DOCUMENTS

| | | | | | |
|---|---|---|---|---|---|
| 5,495,085 | A * | 2/1996 | Yorita | H01H 33/6644 218/123 |
| 6,163,002 | A * | 12/2000 | Ahn | H01H 33/6643 218/123 |
| 6,479,778 | B1 * | 11/2002 | Kimura | H01H 33/6642 218/123 |
| 8,263,894 | B2 * | 9/2012 | Tak | H01H 33/6644 218/123 |
| 8,754,346 | B2 * | 6/2014 | Harada | H01H 33/6642 218/118 |
| 2002/0043514 | A1 * | 4/2002 | Kim | H01H 33/6644 218/118 |
| 2002/0144977 | A1 * | 10/2002 | Kikuchi | H01H 33/6643 218/123 |

FOREIGN PATENT DOCUMENTS

| | | | |
|---|---|---|---|
| JP | H1140017 | A | 2/1999 |
| JP | 2002150902 | A | 5/2002 |

OTHER PUBLICATIONS

Notice of Reasons for Refusal dated Mar. 5, 2024, issued in the corresponding Japanese Patent Application No. 2023-531359, 10 pages including 5 pages of English Translation.

* cited by examiner

FIG. 11
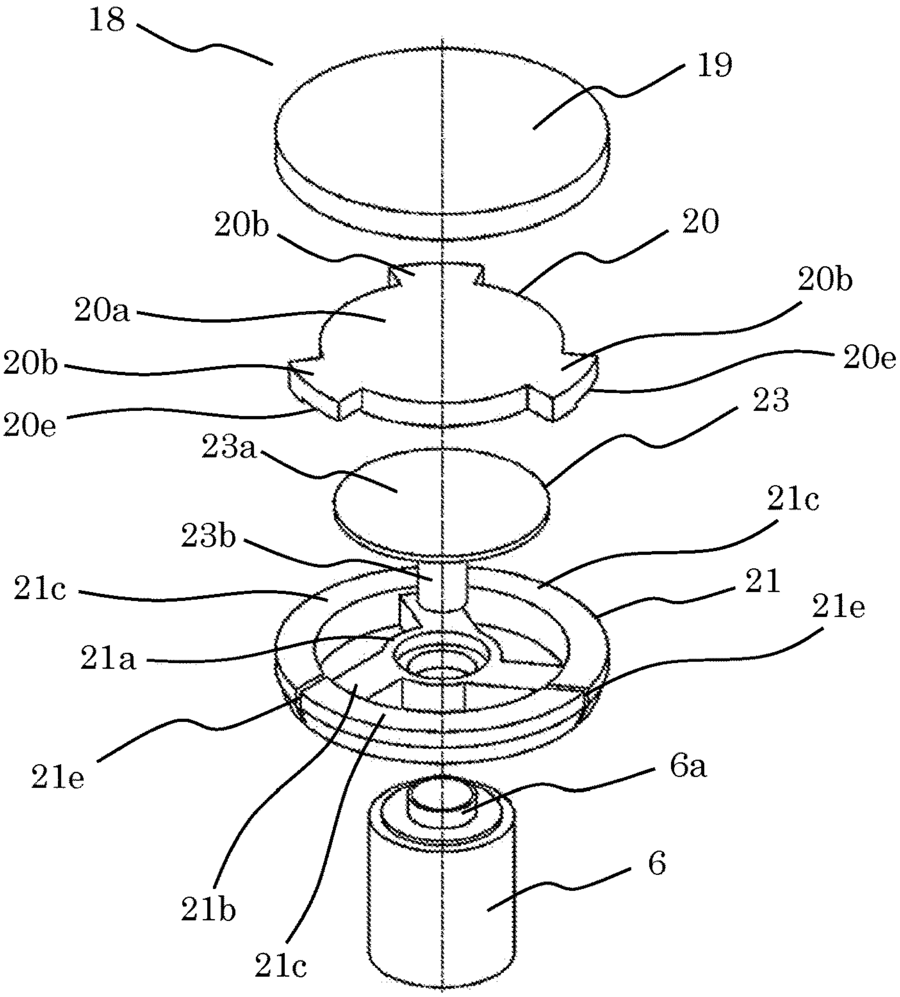
FIG. 12A
FIG. 12B
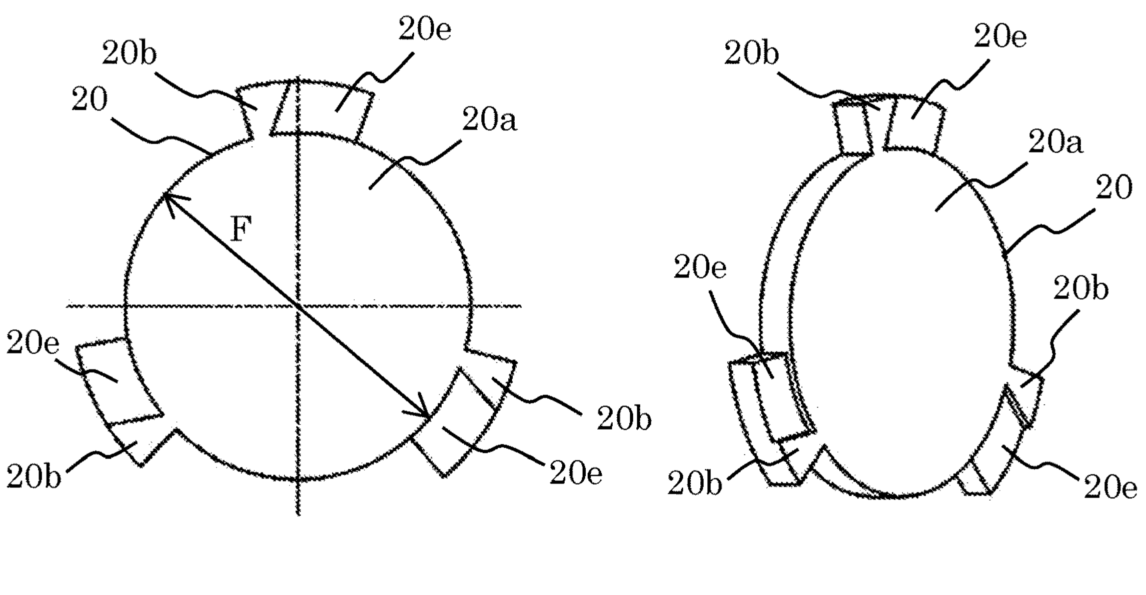

VACUUM INTERRUPTER

TECHNICAL FIELD

The present application relates to a vacuum interrupter.

BACKGROUND ART

In a known a vacuum interrupter, a fixed side flange and a movable side flange are each fixed on both ends of an insulation cylinder by brazing; and a fixed side energization rod and a movable side energization rod are attached respectively to the fixed side flange and the movable side flange. A contact is fixed to each end portion of the fixed side energization rod and the movable side energization rod; and a coil electrode in which an axial magnetic field is generated during energization is provided on the rear surface side of the contact.

The coil electrode has a plurality of circular arc shaped coil portions; and a convex portion (power feeding portion) formed on the coil portion is connected to the contact. By having such a coil portion, an axial magnetic field is generated by a current flowing in the coil portion via the power feeding portion during energization and current interruption is efficiently performed.

RELATED ART DOCUMENT

Patent Document

Patent Document 1: JP-A-2002-150902

SUMMARY OF THE INVENTION

Problems to be Solved by the Invention

In the above known vacuum interrupter, the fixed side power feeding portion is provided on the fixed side coil electrode and the movable side power feeding portion is provided on the movable side coil electrode to flow a current between the fixed side coil electrode and the fixed side contact or between the movable side coil electrode and the movable side contact. In a contact surface, as an area in which an axial magnetic field having necessary magnetic flux density is generated, the area being referred to as an effective magnetic field area, is wide, current density in the contact surface can be reduced and it becomes possible to interrupt the current more effectively. However, a magnetic field cannot be generated in an axial direction by the fixed side power feeding portion provided on the fixed side coil electrode and by the movable side power feeding portion provided on the movable side coil electrode; accordingly, a problem exists in that the effective magnetic field area is lost.

The present application is to disclose a technique for solving the foregoing problem and an object of the present application is to provide a vacuum interrupter which can secure an effective magnetic field area and can improve current interrupting performance.

Means for Solving the Problems

A vacuum interrupter disclosed in the present application is a vacuum interrupter which includes: a cylindrical insulation container, a fixed side electrode arranged in the inside of the insulation container, and a movable side electrode which is arranged in the inside of the insulation container and is brought into contact with and separated from the fixed side electrode. In the vacuum interrupter, the fixed side electrode and the movable side electrode each have a contact; at least either the fixed side electrode or the movable side electrode includes: a power feeding plate having a circular arc shaped power feeding portion formed on the outer circumference of a disk portion, and a coil electrode in which a circular arc shaped coil portion along an outer circumferential edge of the contact is arranged being divided in plurality by a slit on the rear surface side of the power feeding plate and in which a circular arc protrusion portion whose circumferential length is shorter than the circumferential length of a circular arc shaped portion of the circular arc shaped power feeding portion is fixed at the position of the circular arc shaped coil portion, the position being faced to the circular arc shaped power feeding portion; and a cavity is formed between the contact and the circular arc shaped power feeding portion, and an air gap is formed between the circular arc shaped coil portion and the circular arc shaped power feeding portion.

Furthermore, a vacuum interrupter disclosed in the present application is a vacuum interrupter which includes: a cylindrical insulation container, a fixed side electrode arranged in the inside of the insulation container, and a movable side electrode which is arranged in the inside of the insulation container and is brought into contact with and separated from the fixed side electrode. In the vacuum interrupter, the fixed side electrode and the movable side electrode each have a contact; at least either the fixed side electrode or the movable side electrode includes: a power feeding plate having a circular arc shaped power feeding portion formed on the outer circumference of a disk portion, and a coil electrode in which a circular arc shaped coil portion along an outer circumferential edge of the contact is arranged being divided in plurality by a slit on the rear surface side of the power feeding plate and in which a circular arc protrusion portion whose circumferential length is shorter than the circumferential length of a circular arc shaped portion of the circular arc shaped power feeding portion is fixed at the position of the circular arc shaped coil portion, the position being faced to the circular arc shaped power feeding portion; and a cavity is formed between the contact and the circular arc shaped power feeding portion, a power feeding plate float portion is formed on the rear surface of the circular arc shaped power feeding portion of the power feeding plate, and a float portion air gap is formed between the power feeding plate float portion and the circular arc shaped coil portion.

Moreover, a vacuum interrupter disclosed in the present application is a vacuum interrupter which includes: a cylindrical insulation container, a fixed side electrode arranged in the inside of the insulation container, and a movable side electrode which is arranged in the inside of the insulation container and is brought into contact with and separated from the fixed side electrode. In the vacuum interrupter, the fixed side electrode and the movable side electrode each have a contact; at least either the fixed side electrode or the movable side electrode includes: a power feeding plate having a circular arc shaped power feeding portion formed on the outer circumference of a disk portion, and a coil electrode in which a circular arc shaped coil portion along an outer circumferential edge of the contact is arranged being divided in plurality by a slit on the rear surface side of the power feeding plate and in which a circular arc protrusion portion whose circumferential length is shorter than the circumferential length of a circular arc shaped portion of the circular arc shaped power feeding portion is fixed at the position of the circular arc shaped coil portion, the position being faced to the circular arc shaped power feeding portion; and a cavity is formed between the contact and the circular arc shaped power feeding portion, a circular arc shaped first groove portion is formed on a termination end portion of the circular arc shaped coil portion of the coil electrode, a circular arc shaped second groove portion that is deeper than the depth of the circular arc shaped first groove portion is formed on a beginning end portion of the circular arc shaped coil portion of the coil electrode which sandwiches the slit, the circular arc shaped power feeding portion of the power feeding plate is arranged over the circular arc shaped first groove portion and the circular arc shaped second groove portion, the circular arc shaped power feeding portion of the power feeding plate is fixed to the circular arc shaped first groove portion, and a groove portion air gap is formed between the circular arc shaped power feeding portion of the power feeding plate and the circular arc shaped second groove portion.

Additionally, a vacuum interrupter disclosed in the present application is a vacuum interrupter which includes: a cylindrical insulation container, a fixed side electrode arranged in the inside of the insulation container, and a movable side electrode which is arranged in the inside of the insulation container and is brought into contact with and separated from the fixed side electrode. In the vacuum interrupter, at least either the fixed side electrode or the movable side electrode includes: a contact which has a contact surface that is brought into contact with and separated from other electrode and a rear surface on the opposite side to the contact surface; a coil electrode which is arranged on the rear surface side of the contact and has a circular arc shaped circular arc portion extending in a circumferential direction; and a power feeding plate which has a connection part that is to be connected to the coil electrode and an opposite part that is adjacent to the connection part and is faced to the circular arc portion of the coil electrode via an air gap and in which a surface on the opposite side to the connection part and the opposite part is connected to the contact.

Advantageous Effect of the Invention

According to the vacuum interrupter disclosed in the present application, there can be obtained a vacuum interrupter which can secure an effective magnetic field area and can improve current interrupting performance.

BRIEF DESCRIPTION OF THE DRAWINGS

FIG. 5A is a rear view, and FIG. 5B is a perspective view;

FIG. 7A is a front view, and FIG. 7B is a rear view;

FIG. 9A is a front view, and FIG. 9B is a rear view;

FIG. 11 is an exploded perspective view showing an electrode structure in a vacuum interrupter according to Embodiment 4;

FIGS. 12A, 12B are views showing a power feeding plate in the vacuum interrupter according to Embodiment 4, FIG. 12A is a rear view, and FIG. 12B is a perspective view;

FIG. 18A is a front view, and FIG. 18B is a perspective view;

MODE FOR CARRYING OUT THE INVENTION

Embodiment 1

Figure 1:
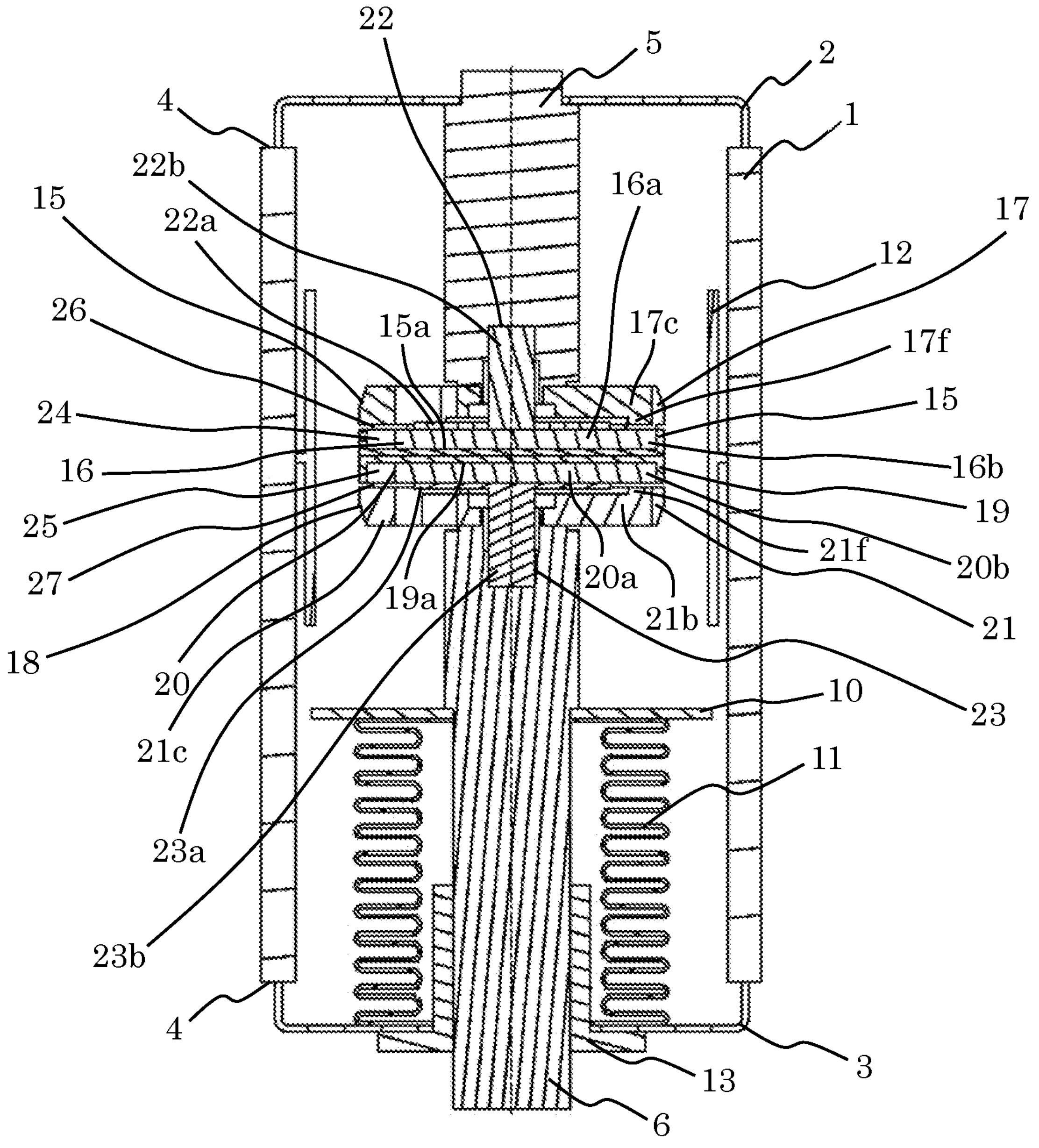
FIG. 1 is a sectional view showing a vacuum interrupter according to Embodiment 1.
Figure 2:
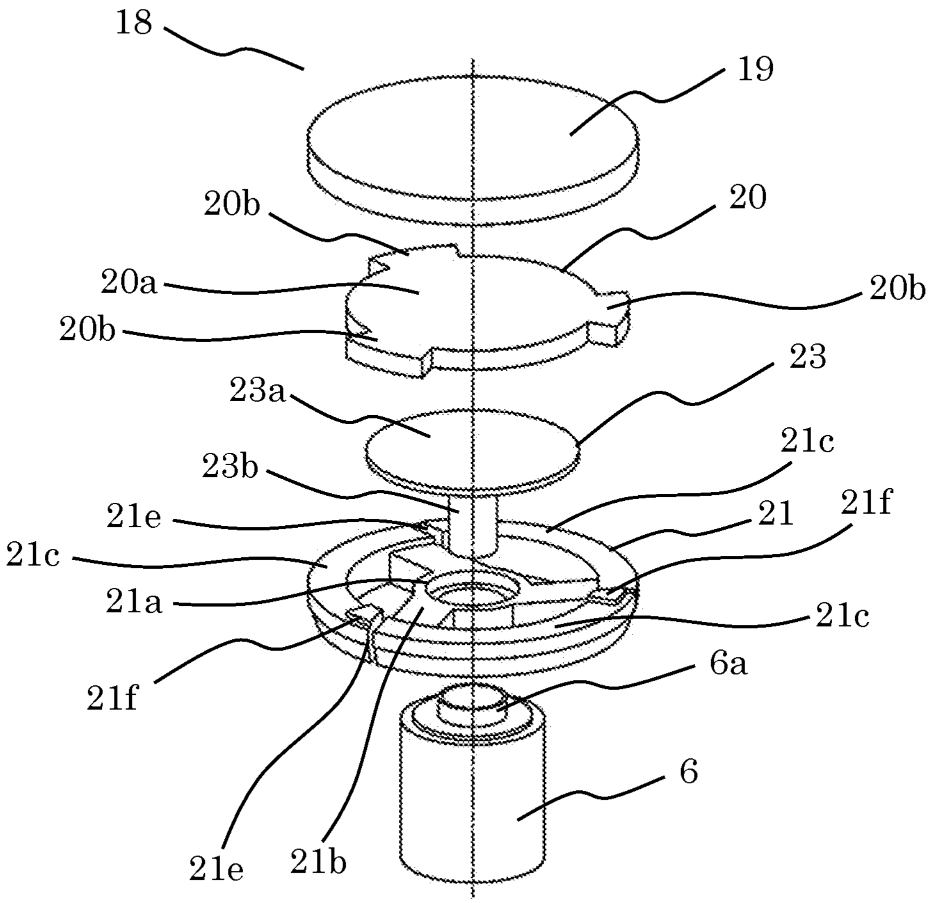
FIG. 2 is an exploded perspective view showing an electrode structure in the vacuum interrupter according to Embodiment 1.
Figure 3:
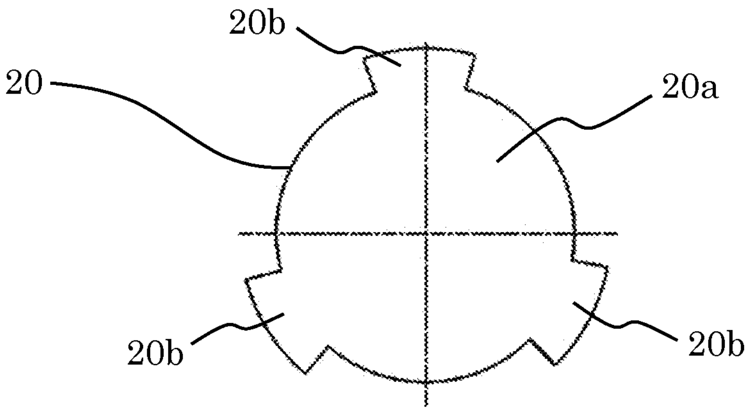
FIG. 3 is a front view showing a power feeding plate in the vacuum interrupter according to Embodiment 1.
Figure 4:
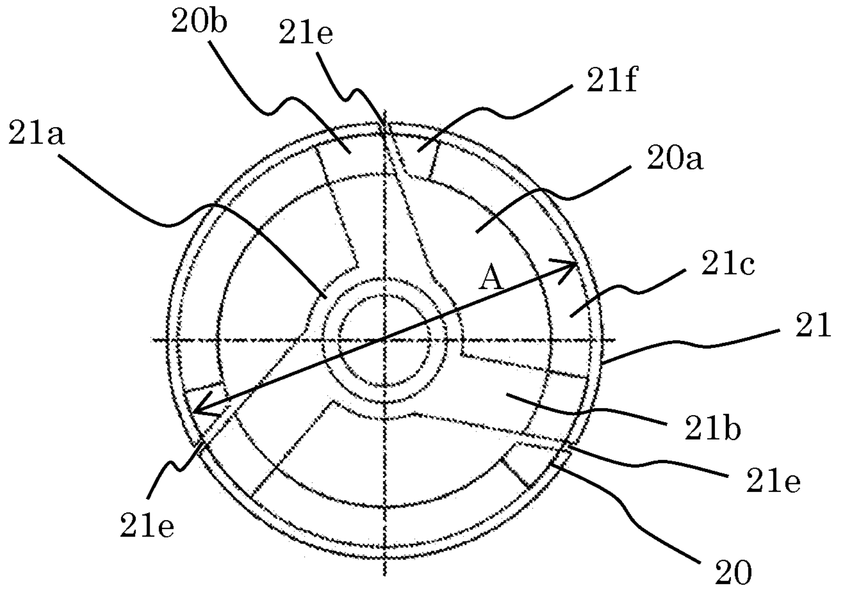
FIG. 4 is a front view showing a state where a coil electrode and the power feeding plate are fixed in the vacuum interrupter according to Embodiment 1.
Figure 5A:
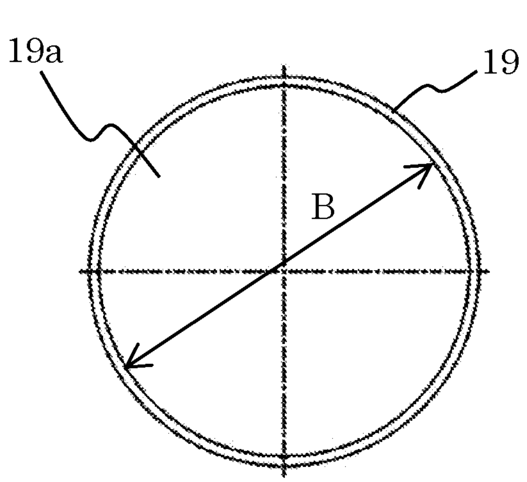
FIGS. 5A, 5B are views showing a contact in the vacuum interrupter according to Embodiment 1.
Figure 5B:
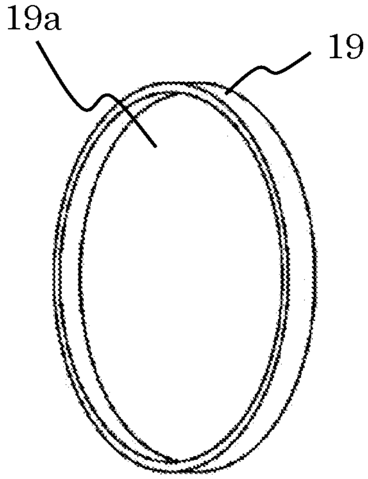
Figure 6:
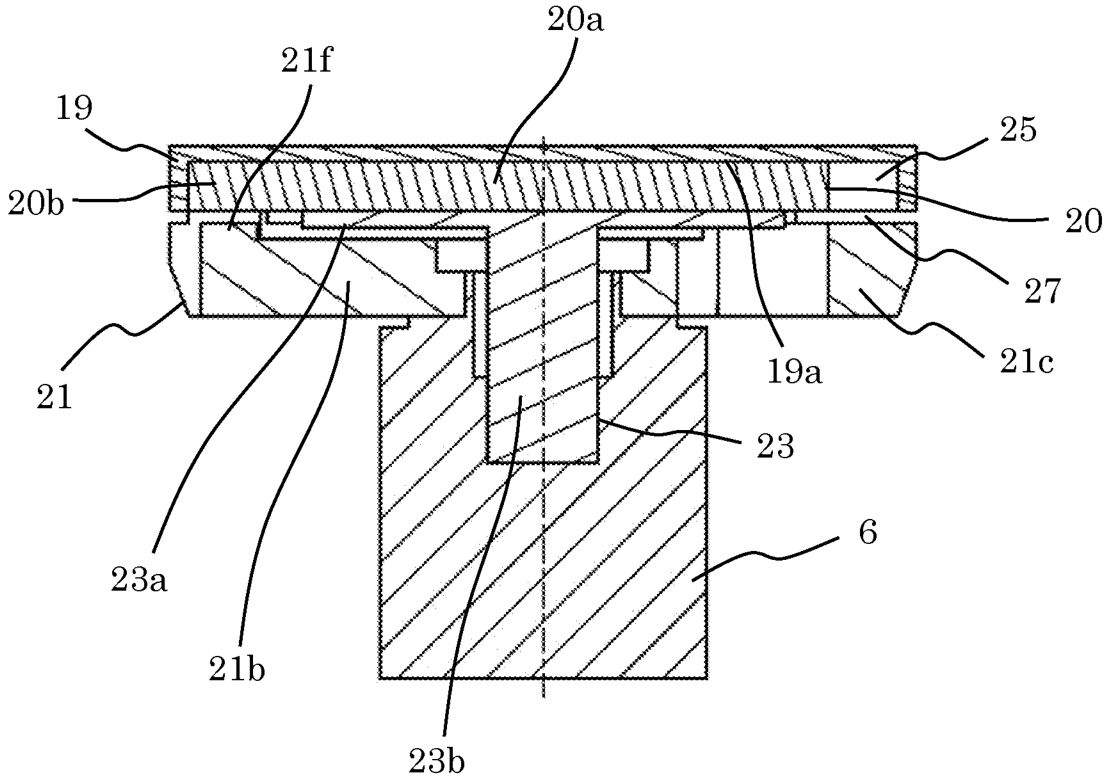
FIG. 6 is a sectional view showing the electrode structure in the vacuum interrupter according to Embodiment 1.

Hereinafter, Embodiment 1 of the present application will be described based on FIG. 1 through FIG. 6; and, in each of the drawings, identical or equivalent members and parts will be described with the same reference numerals (and letters) assigned thereto. FIG. 1 is a sectional view showing a vacuum interrupter according to Embodiment 1. FIG. 2 is an exploded perspective view showing an electrode structure in the vacuum interrupter according to Embodiment 1. FIG. 3 is a front view showing a power feeding plate in the vacuum interrupter according to Embodiment 1. FIG. 4 is a front view showing a state where a coil electrode and the power feeding plate are fixed in the vacuum interrupter according to Embodiment 1. FIGS. 5A, 5B are views showing a contact in the vacuum interrupter according to Embodiment 1, FIG. 5A is a rear view, and FIG. 5B is a perspective view. FIG. 6 is a sectional view showing the electrode structure in the vacuum interrupter according to Embodiment 1.

The present application relates to the vacuum interrupter, which has a fixed side electrode and a movable side electrode which are attached in a contactable and separable manner in the vacuum container, and in which electric arc generated during current interruption is diffused by a magnetic field that is generated by a current flowing in the electrodes.

The vacuum interrupter has a cylindrical insulation cylinder 1 using an insulator such as alumina ceramics, glass, or the like as a material; a fixed side flange 2 and a movable side flange 3, which use metal such as stainless steel or the like as a material, are fixed by vacuum brazing to a metallization layer 4 formed on both ends of the insulation cylinder 1 to form a container and to keep the inside thereof high vacuum and airtight.

A fixed side energization rod 5 is fixed to the fixed side flange 2 fixed to one end of the insulation cylinder 1; and a movable side energization rod 6 is attached to the movable side flange 3 via a bellows 11. The movable side flange 3 is fixed to one end of the bellows 11; and the movable side energization rod 6 is fixed to the other end of the bellows 11 via a bellows cover 10 provided for the purpose of preventing the bellows 11 from being contaminated by the electric arc generated during current interruption.

Furthermore, an electric arc shield 12 is provided in the insulation cylinder 1 so as to surround a fixed side contact 15 and a movable side contact 19 which are faced to each other. In the movable side, a guide 13 having a bearing function for operating smoothly on the axial center in the process of its opening and closing is attached to a movable side end portion.

A fixed side electrode 14 and a movable side electrode 18 are attached respectively to the fixed side energization rod 5 and the movable side energization rod 6 so as to be faced to each other. The fixed side electrode 14 includes: a fixed side contact 15 which is formed in a disk shape and is formed with a fixed side contact back spot facing portion 15*a* on a back surface; a fixed side power feeding plate 16 which is fixed to the inner surface of the fixed side contact back spot facing portion 15*a* of the fixed side contact 15 and has a fixed side circular arc shaped power feeding portion 16*b* arranged evenly, for example, at three places on the outer circumference of a disk shaped fixed side disk portion 16*a*; and a fixed side coil electrode 17 in which a fixed side circular arc shaped coil portion 17*c* along an outer circumferential edge of the fixed side contact 15 is arranged being divided in plurality, for example, arranged being divided evenly into three places by a fixed side slit 17*e* (not shown in the drawing) on the rear surface side of the fixed side power feeding plate 16 and in which a fixed side circular arc shaped protrusion portion 17*f* of a circular arc shaped portion whose circumferential length is shorter than the circumferential length of a circular arc shaped portion of the fixed side circular arc shaped power feeding portion 16*b* is fixed at the position of the fixed side circular arc shaped coil portion 17*c* arranged evenly, for example, at three places, the position being faced to the fixed side circular arc shaped power feeding portion 16*b*. One end of the fixed side circular arc shaped coil portion 17*c* has a fixed side lateral arm portion 17*b* (not shown in the drawing) coupled to a fixed side coil electrode fitting portion 17*a*.

The movable side electrode 18 includes: the movable side contact 19 which is formed in a disk shape and is formed with a movable side contact back spot facing portion 19*a* on a back surface; a movable side power feeding plate 20 which is fixed to the inner surface of the movable side contact back spot facing portion 19*a* of the movable side contact 19 and has a movable side circular arc shaped power feeding portion 20*b* arranged evenly, for example, at three places on the outer circumference of a disk shaped movable side disk portion 20*a*; and a movable side coil electrode 21 in which a movable side circular arc shaped coil portion 21*c* along an outer circumferential edge of the movable side contact 19 is arranged being divided in plurality, for example, arranged evenly at three places by a movable side slit 21*e* on the rear surface side of the movable side power feeding plate 20 and in which a movable side circular arc shaped protrusion portion 21*f* of a circular arc shaped portion whose circumferential length is shorter than the circumferential length of a circular arc shaped portion of the movable side circular arc shaped power feeding portion 20*b* is fixed at the position of the movable side circular arc shaped coil portion 21*c* arranged evenly, for example, at three places, the position being faced to the movable side circular arc shaped power feeding portion 20*b*. One end of the movable side circular arc shaped coil portion 21*c* has a movable side lateral arm portion 21*b* coupled to a movable side coil electrode fitting portion 21*a*.

A fixed side disk portion 22*a* and a fixed side strut portion 22*b* are included, the fixed side disk portion 22*a* is brought into contact with the fixed side power feeding plate 16, and the fixed side strut portion 22*b* is fixed to a fixed side energization rod fitting portion 5*a* (not shown in the drawing) of the fixed side energization rod 5 to form a fixed side reinforcing member 22; and a movable side disk portion 23*a* and a movable side strut portion 23*b* are included, the movable side disk portion 23*a* is brought into contact with a movable side power feeding plate 20, and the movable side strut portion 23*b* is fixed to a movable side energization rod fitting portion 6*a* of the movable side energization rod 6 to form a movable side reinforcing member 23.

A fixed side cavity 24 is formed between the fixed side contact back spot facing portion 15*a* and the fixed side circular arc shaped power feeding portion 16*b*; a movable side cavity 25 is formed between the movable side contact back spot facing portion 19*a* and the movable side circular arc shaped power feeding portion 20*b*; a fixed side air gap 26 is formed between the fixed side circular arc shaped coil portion 17*c* and the fixed side circular arc shaped power feeding portion 16*b*; and a movable side air gap 27 is formed between the movable side circular arc shaped coil portion 21*c* and the movable side circular arc shaped power feeding portion 20*b*.

The fixed side power feeding plate 16 includes the disk shaped fixed side disk portion 16*a* and the fixed side circular arc shaped power feeding portion 16*b* formed in a circular arc shape from the fixed side disk portion 16*a*. A surface on the fixed side coil electrode 17 side of the fixed side circular arc shaped power feeding portion 16*b* has a connection part to be connected to the fixed side coil electrode 17 and an opposite part adjacent to the connection part; and the opposite part is faced to the fixed side circular arc shaped coil portion 17*c* of the fixed side coil electrode 17 via the air gap. As to the fixed side coil electrode 17, in addition to the fixed side fitting portion 17*a* to be fitted with the fixed side energization rod fitting portion 5*a* (not shown in the drawing) of the fixed side energization rod 5, a plurality of the circular arc shaped fixed side circular arc shaped coil portion 17*c* is arranged being divided by the fixed side slit 17*e* (not shown in the drawing) and one end of the fixed side circular arc shaped coil portion 17*c* has the fixed side circular arc shaped protrusion portion 17*f* that is vertically protruded. Incidentally, the fixed side power feeding plate 16 may be permissible to use the same material as the fixed side coil electrode 17, for example, copper or the like; however, it is not particularly limited and it may be permissible to use material different from the fixed side coil electrode 17.

The movable side power feeding plate 20 includes the disk shaped movable side disk portion 20*a* and the movable side circular arc shaped power feeding portion 20*b* formed in a circular arc shape from the movable side disk portion 20*a*, as shown in FIG. 3. A surface on the movable side circular arc shaped power feeding portion 20*b* side has a connection part to be connected to the movable side coil electrode 21 and an opposite part adjacent to the connection part; and the opposite part is faced to the movable side circular arc shaped coil portion 21*c* of the movable side coil electrode 21 via an air gap. As to the movable side coil electrode 21, as shown in FIG. 4, in addition to the movable side coil electrode fitting portion 21*a* to be fitted with the movable side energization rod fitting portion 6*a* of the movable side energization rod 6, a plurality of the circular arc shaped movable side circular arc shaped coil portion 21*c* is arranged being divided by the movable side slit 21*e* and one end of the movable side circular arc shaped coil portion 21*c* has the movable side circular arc shaped protrusion portion 21*f* that is vertically protruded. Incidentally, the movable side power feeding plate 20 may be permissible to use the same material as the movable side coil electrode 21, for example, copper or the like; however, it is not particularly limited and it may be permissible to use material different from the movable side coil electrode 21.

One end of the fixed side circular arc shaped power feeding portion 16*b* of the fixed side power feeding plate 16 is fixed in a state circumferentially conformed with respect to the fixed side circular arc shaped protrusion portion 17*f* and the circumferential length of the fixed side circular arc shaped protrusion portion 17*f* is shorter than the circumferential length of the fixed side circular arc shaped power feeding portion 16*b*; thus, the fixed side air gap 26 is provided between the fixed side circular arc shaped power feeding portion 16*b* that is not fixed to the fixed side circular arc shaped coil portion 17*c* and the fixed side circular arc shaped coil portion 17*c*.

One end of the movable side circular arc shaped power feeding portion 20*b* of the movable side power feeding plate 20 is fixed in a state circumferentially conformed with respect to the movable side circular arc shaped protrusion portion 21*f* and the circumferential length of the movable side circular arc shaped protrusion portion 21*f* is shorter than the circumferential length of the movable side circular arc shaped power feeding portion 20*b*; thus, the movable side air gap 27 is provided between the movable side circular arc shaped power feeding portion 20*b* that is not fixed to the movable side circular arc shaped coil portion 21*c* and the movable side circular arc shaped coil portion 21*c*, as shown in FIG. 6.

The fixed side contact 15 is provided with the fixed side contact back spot facing portion 15*a* on a back surface opposite to an opposite surface and a surface opposite to the surface of the fixed side circular arc shaped power feeding portion 16*b* fixed to the fixed side circular arc shaped protrusion portion 17*f* is fixed. Since something to be fixed is not present in the circumferential direction of the fixed side circular arc shaped power feeding portion 16*b* and the fixed side contact back spot facing portion 15*a*, the fixed side cavity 24 is formed.

As shown in FIGS. 5A, 5B, the movable side contact 19 is provided with the movable side contact back spot facing portion 19*a* on a back surface opposite to an opposite surface; and a surface opposite to the surface of the movable side circular arc shaped power feeding portion 20*b* fixed to the movable side circular arc shaped protrusion portion 21*f* is fixed. Since something to be fixed is not present in the circumferential direction of the movable side circular arc shaped power feeding portion 20*b* and the movable side contact back spot facing portion 19*a*, the movable side cavity 25 is formed as shown in FIG. 6.

The umbrella shaped fixed side reinforcing member 22 having the fixed side disk portion 22*a* and the fixed side strut portion 22*b* is provided between the fixed side coil electrode 17 and the fixed side power feeding plate 16 to reinforce the fixed side contact 15, the fixed side strut portion 22*b* is fixed to the fixed side energization rod 5, and the fixed side disk portion 22*a* is arranged being brought into contact with the fixed side disk portion 16*a* of the fixed side power feeding plate 16; thus, the fixed side contact 15 is reinforced.

The umbrella shaped movable side reinforcing member 23 having the movable side disk portion 23*a* and the movable side strut portion 23*b* is provided between the movable side coil electrode 21 and the movable side power feeding plate 20 to reinforce the movable side contact 19, the movable side strut portion 23*b* is fixed to the movable side energization rod 6, and the movable side disk portion 23*a* is arranged being brought into contact with the movable side disk portion 20*a* of the movable side power feeding plate 20; thus, the movable side contact 19 is reinforced.

In the case of the configuration of the above vacuum interrupter according to Embodiment 1, a current flowed from the fixed side energization rod 5 or the movable side energization rod 6 to the fixed side coil electrode 17 or the movable side coil electrode 21 passes through the fixed side power feeding plate 16 or the movable side power feeding plate 20 and flows from the fixed side circular arc shaped power feeding portion 16*b* or the movable side circular arc shaped power feeding portion 20*b* to the fixed side contact 15 or the movable side contact 19. It becomes possible to extend a current path of the fixed side circular arc shaped coil portion 17*c* of the fixed side coil electrode 17 or the movable side circular arc shaped coil portion 21*c* of the movable side coil electrode 21 by making the fixed side power feeding plate 16 or the movable side power feeding plate 20 have a power feeding function from the fixed side coil electrode 17 or the movable side coil electrode 21 to the fixed side contact 15 or the movable side contact 19.

Furthermore, the fixed side air gap 26 is provided between the fixed side circular arc shaped power feeding portion 16*b* having the power feeding function and the fixed side circular arc shaped coil portion 17*c*, or the movable side air gap 27 is provided between the movable side circular arc shaped power feeding portion 20*b* having the power feeding function and the movable side circular arc shaped coil portion 21*c*: thus, a current flows so as to pass the lower side of the fixed side circular arc shaped power feeding portion 16*b* or the movable side circular arc shaped power feeding portion 20*b*.

Furthermore, since the fixed side cavity 24 or the movable side cavity 25 is formed, the current is difficult to flow in the circumferential direction from the fixed side circular arc shaped power feeding portion 16*b* or the movable side circular arc shaped power feeding portion 20*b* and a current flows only in the vertical direction toward the fixed side contact 15 or the movable side contact 19.

Here, if the outer diameter of the fixed side circular arc shaped power feeding portion 16*b* or the movable side circular arc shaped power feeding portion 20*b* is set to A as shown in FIG. 4 and the diameter of the fixed side contact back spot facing portion 15*a* or the movable side contact back spot facing portion 19*a* is set to B as shown in FIG. 5, it is desirable to establish the relationship of $A \leq B$ from the standpoint of assembly. It goes without saying that it is no problem to apply round machining or taper machining to an edge of each part in terms of machining.

Furthermore, by the above Embodiment 1, in addition to elongation of the current path of the fixed side circular arc shaped coil portion 17*c* or the movable side circular arc shaped coil portion 21*c*, the current passes through the lower side of the fixed side circular arc shaped power feeding portion 16*b* or the movable side circular arc shaped power feeding portion 20*b*; thus, it becomes possible to generate an axial magnetic field also at a place having the power feeding function, an area in which magnetic flux density effective for diffusing electric arc in a contact surface, the area being referred to as an effective magnetic field area, is extended, current density to be burdened per unit area of the contact surface during current interruption is reduced, and interrupting performance is improved.

Furthermore, in the known vacuum interrupter that generates the axial magnetic field and improves interrupting performance, a problem also exists in that an eddy current is induced in the contact and a magnetic field generated due to the eddy current weakens the axial magnetic field generated by the coil electrode. It is known that a radial slit is provided in the contact to avoid the eddy current; however, the slit passing through the contact causes a new problem that becomes a defect part with respect to withstand voltage performance between opposite contacts in a vacuum interrupter used especially at a class of high rated voltage. Further, it is also known that a radial groove which does not pass through a contact is provided in the coil electrode side of the contact; however, the groove needs to be provided being carefully processed by a small edged tool and accordingly a problem exists in that it requires time for a contact manufacturing process and it becomes expensive.

However, as in the above Embodiment 1, the current is difficult to flow in the circumferential direction from the fixed side circular arc shaped power feeding portion 16*b* or the movable side circular arc shaped power feeding portion 20*b* by forming the fixed side cavity 24 or the movable side cavity 25 and the eddy current flowing in the fixed side contact 15 or the movable side contact 19 can be suppressed while avoiding deterioration in withstand voltage performance due to providing the slit in the fixed side contact 15 or the movable side contact 19. If the eddy current is suppressed, magnetic field strength and the effective magnetic field area are improved and interrupting performance is further improved. Since the interrupting performance is improved, it also becomes possible to interrupt a larger current and it can contribute to an increase in current of the vacuum interrupter. Since the effective magnetic field area is extended, diffusion of electric arc of the contact surface is expedited and thermal damage of the contact surface is further reduced; thus, interrupting life is also improved and it also becomes possible to expand an application range to a large number of times of interrupting specification or the like.

The fixed side power feeding plate 16 or the movable side power feeding plate 20 in the above Embodiment 1 can be manufactured easily and relatively inexpensively by press working. Additionally, the area having effective magnetic flux density required by a smaller diameter than the known coil electrode can be secured and thus a reduction in diameter of the coil electrode is achieved. Furthermore, since the reduction in diameter is achieved, an increase in size of the contact as before can be suppressed even if an energization current value is increased.

Along with the reduction in diameter of the coil electrode, a reduction in diameter of other components of the vacuum interrupter can also be performed, and it can contribute to a reduction in diameter or a reduction in weight of the whole vacuum interrupter. As a matter of course, it is also linked to the reduction in cost by actualizing the reduction in diameter or a reduction in weight of the vacuum interrupter.

In the above Embodiment 1, an example of applying the power feeding plate to both the fixed side electrode and the movable side electrode has been shown; however, it may be permissible to provide the power feeding plate in either the fixed side electrode or the movable side electrode. Furthermore, it may also be permissible to provide the contact back spot facing portion of the contact rear surface in either the fixed side electrode or the movable side electrode.

Embodiment 2

Figure 7A:
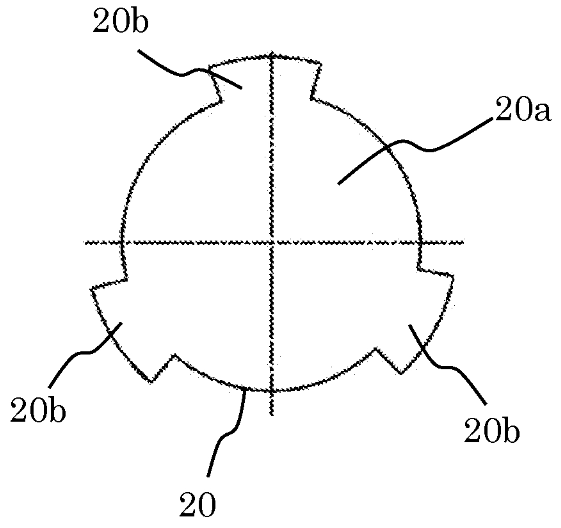
FIGS. 7A, 7B are views showing a power feeding plate in a vacuum interrupter according to Embodiment 2.
Figure 7B:
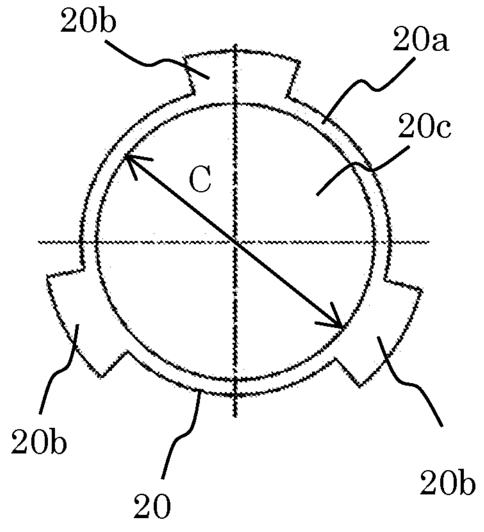
Figure 8:
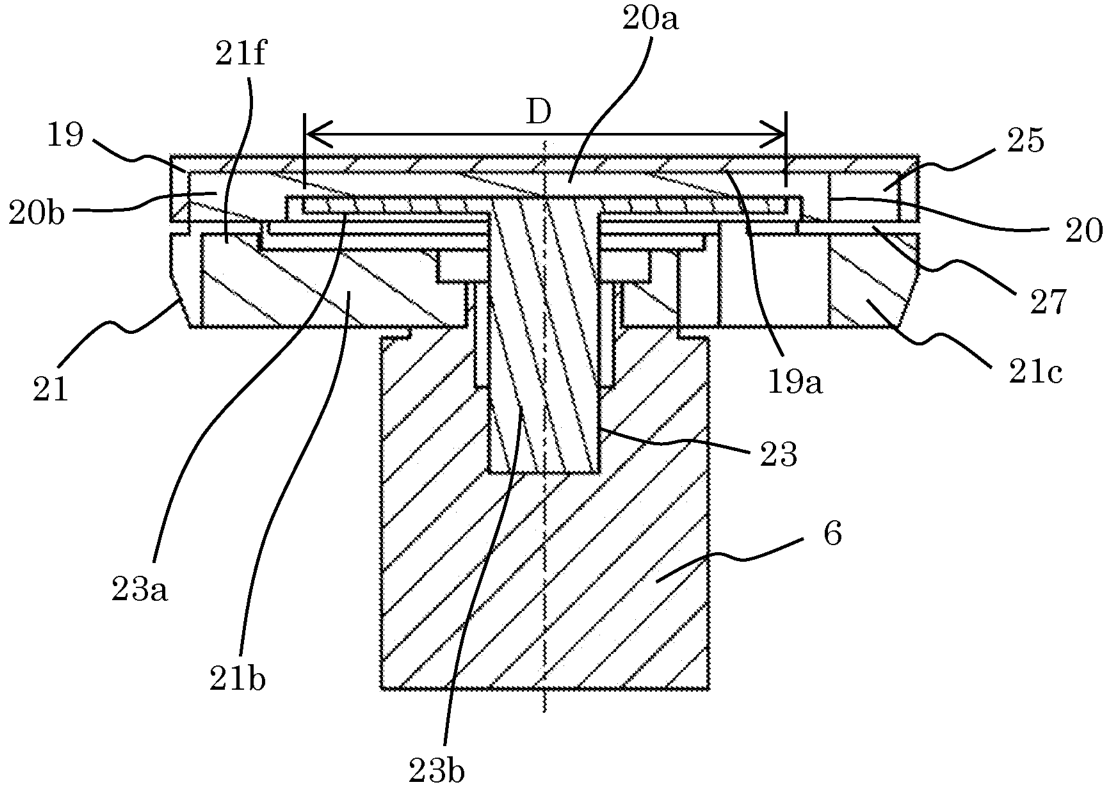
FIG. 8 is a sectional view showing an electrode structure in the vacuum interrupter according to Embodiment 2.

Embodiment 2 of the present application will be described based on FIGS. 7A, 7B and FIG. 8; and, in each of the drawings, identical or equivalent members and parts will be described with the same reference numerals (and letters) assigned thereto. FIGS. 7A, 7B are views showing a power feeding plate in a vacuum interrupter according to Embodiment 2, FIG. 7A is a front view, and FIG. 7B is a rear view. FIG. 8 is a sectional view showing an electrode structure in the vacuum interrupter according to Embodiment 2.

In contrast to the structure of the vacuum interrupter presented in the above Embodiment 1, Embodiment 2 of the present application is different only in the shape of a fixed side power feeding plate 16 or a movable side power feeding plate 20. Description will be made based on, for example, a movable side electrode 18 in Embodiment 2 of the present application. As shown in FIGS. 7A, 7B, as with the movable side power feeding plate 20 shown in the above Embodiment 1, there are included a disk shaped movable side disk portion 20*a* and a movable side circular arc shaped power feeding portion 20*b* formed in a circular arc shape from the movable side disk portion 20*a*. Then, a movable side power feeding plate spot facing portion 20*c* is formed on the back surface of the movable side disk portion 20*a*.

The rear surface of the movable side circular arc shaped power feeding portion 20*b* is fixed to each one end in a state circumferentially conformed with respect to a movable side circular arc shaped protrusion portion 21*f* of a movable side coil electrode 21, as with the above Embodiment 1. The circumferential length of the movable side circular arc shaped protrusion portion 21*f* is shorter than the circumferential length of the movable side circular arc shaped power feeding portion 20*b*; thus, as shown in FIG. 8, a movable side air gap 27 is provided between the movable side circular arc shaped power feeding portion 20*b* that is not fixed to a movable side circular arc shaped coil portion 21*c* and the movable side circular arc shaped coil portion 21*c*, the surface of the movable side circular arc shaped power feeding portion 20*b* which is opposite to the surface fixed to the movable side circular arc shaped protrusion portion 21*f* is fixed to a movable side contact back spot facing portion 19*a*, and a movable side cavity 25 is formed between the movable side circular arc shaped power feeding portion 20*b* and the movable side contact back spot facing portion 19*a*.

An umbrella shaped movable side reinforcing member 23 having a movable side disk portion 23*a* and a movable side strut portion 23*b* is provided between the movable side coil electrode 21 and the movable side power feeding plate 20 to reinforce a movable side contact 19, the movable side strut portion 23*b* is fixed to a movable side energization rod 6, and the movable side disk portion 23*a* is arranged being brought into contact with the movable side power feeding plate spot facing portion 20*c* of the movable side power feeding plate 20; thus, the movable side contact 19 is reinforced.

Also in this Embodiment 2, a current flowed from the movable side energization rod 6 to the movable side coil electrode 21 passes through the movable side power feeding plate 20 and flows from the movable side circular arc shaped power feeding portion 20*b* to the movable side contact 19. It becomes possible to extend a current path of the movable side circular arc shaped coil portion 21*c* of the movable side coil electrode 21 by making the movable side power feeding plate 20 have a power feeding function from the movable side coil electrode 21 to the movable side contact 19.

Furthermore, the movable side air gap 27 is provided between the movable side circular arc shaped power feeding portion 20*b* having the power feeding function and the movable side circular arc shaped coil portion 21*c*; thus, the current passes through the lower side of the movable side circular arc shaped power feeding portion 20*b*. Moreover, since the movable side cavity 25 is formed, the current is difficult to flow in a circumferential direction from the movable side circular arc shaped power feeding portion 20*b* and the current flows only in a vertical direction toward the movable side contact 19.

The movable side power feeding plate spot facing portion 20*c* is provided on the movable side power feeding plate 20; thus, a clearance is generated in axial dimension between the movable side power feeding plate 20 and the movable side coil electrode 21 and it becomes possible to elongate the entire length of the movable side reinforcing member 23 or to increase the thickness of the movable side disk portion 23*a* of the movable side reinforcing member 23.

Here, if the diameter of the movable side power feeding plate spot facing portion 20*c* is set to C as shown in FIG. 7 and the outer diameter of the movable side disk portion 23*a* of the movable side reinforcing member 23 is set to D as shown in FIG. 8, it is desirable that the relationship of D C is established from the standpoint of assembly. Furthermore, it goes without saying that it is no problem to apply round machining or taper machining to an edge of each part in terms of machining.

Also by this Embodiment 2, in addition to elongation of the current path of the movable side circular arc shaped coil portion 21*c*, the current passes through the lower side of the movable side circular arc shaped power feeding portion 20*b*; thus, it becomes possible to generate an axial magnetic field also at a place having the power feeding function, an effective magnetic field area is extended, current density to be burdened per unit area of a contact surface during current interruption is reduced, and interrupting performance is improved.

Further, as with the above Embodiment 1, the movable side cavity 25 is formed and the current is difficult to flow in the circumferential direction from the movable side circular arc shaped power feeding portion 20*b*; thus, an eddy current flowing in the movable side contact 19 can be suppressed while avoiding deterioration in withstand voltage performance due to providing a slit in the movable side contact 19. If the eddy current is suppressed, magnetic field strength and the effective magnetic field area are improved and the interrupting performance is improved.

Since the interrupting performance is improved, it also becomes possible to interrupt a larger current and it can contribute to an increase in current of the vacuum interrupter. Since the effective magnetic field area is extended, diffusion of electric arc of the contact surface is expedited and thermal damage of the contact surface is further reduced; thus, interrupting life is also improved and it also becomes possible to expand an application range to a large number of times of interrupting specification or the like.

Furthermore, the movable side reinforcing member 23 is formed of stainless steel or the like, is made of material which is higher in strength and higher in electrical resistivity than the movable side coil electrode 21 or the movable side power feeding plate 20 and the movable side contact 19, and is no different from a conductor; thus, although a leakage current flows, the clearance is generated in axial dimension between the movable side power feeding plate 20 and the movable side coil electrode 21 by providing the movable side power feeding plate spot facing portion 20*c* on the movable side power feeding plate 20, it becomes possible to elongate the entire length of the movable side reinforcing member 23, specific resistance of the movable side reinforcing member 23 is increased, and the leakage current is difficult to flow in the movable side reinforcing member 23.

If the leakage current is difficult to flow, the current flowing in the movable side coil electrode 21 is increased and it becomes possible to improve magnetic field strength and the effective magnetic field area.

It may be permissible to elongate the entire length of the movable side reinforcing member 23 by increasing the thickness of the movable side disk portion 23*a* of the movable side reinforcing member 23. In this case, since the strength of the movable side reinforcing member 23 is increased, it becomes possible to expand an application range to specification in which the mass of a movable portion is heavy and high strength sustainable against contact closing impact during close-contact is required.

The movable side power feeding plate 20 in this Embodiment 2 can be manufactured easily and relatively inexpensively by press working. Cutting of the movable side power feeding plate spot facing portion 20*c* can also be performed by a relatively large edged tool and thus it is not linked to a considerable increase in cost. Additionally, if this Embodiment 2 is adopted, an area having effective magnetic flux density required by a smaller diameter than the known movable side coil electrode can be secured and thus a reduction in diameter of the movable side coil electrode is achieved.

Along with the reduction in diameter of the movable side coil electrode, a reduction in diameter of other components of the vacuum interrupter can also be performed and it can contribute to a reduction in diameter or a reduction in weight of the whole vacuum interrupter. As a matter of course, it is also linked to a reduction in cost by actualization of the reduction in diameter or the reduction in weight of the vacuum interrupter.

By the way, in the above Embodiment 2, although the description has been made based on the movable side electrode 18, the same configuration as the movable side electrode 18 can also be applied to the fixed side electrode 14 and the same effect can be exhibited. More specifically, as with the fixed side power feeding plate 16 shown in the above Embodiment 1, there are included a disk shaped fixed side disk portion 16*a* and a fixed side circular arc shaped power feeding portion 16*b* formed in a circular arc shape from the fixed side disk portion 16*a*; and it may be permissible that a fixed side power feeding plate spot facing portion 16*c* (not shown in the drawing) is formed on the back surface of the fixed side disk portion 16*a* and a fixed side disk portion 22*a* of a fixed side reinforcing member 22 is arranged being brought into contact with the fixed side power feeding plate spot facing portion 16*c* of the fixed side power feeding plate 16.

Embodiment 3

Figure 9A:
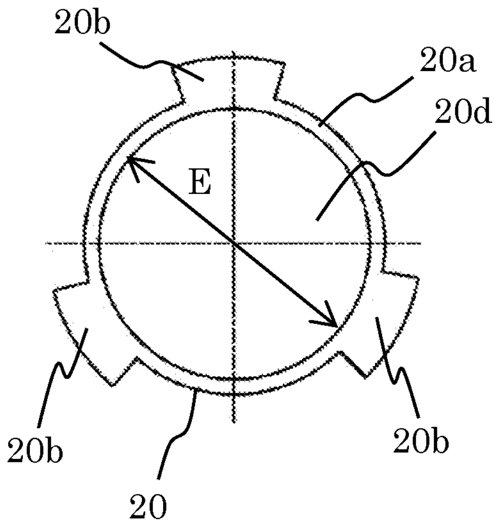
FIGS. 9A, 9B, are views showing a power feeding plate in a vacuum interrupter according to Embodiment 3.
Figure 9B:
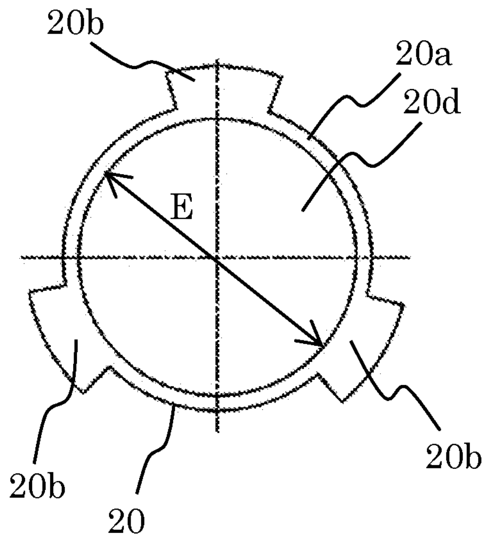
Figure 10:
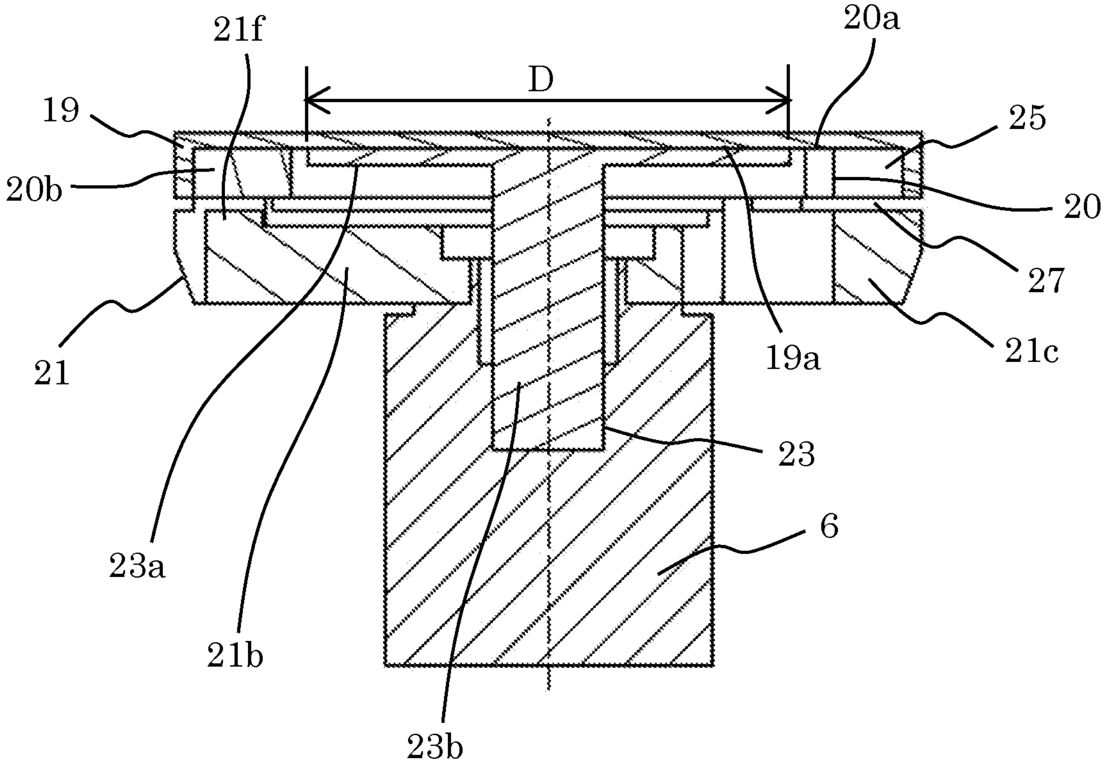
FIG. 10 is a sectional view showing an electrode structure in the vacuum interrupter according to Embodiment 3.

Embodiment 3 of the present application will be described based on FIGS. 9A, 9B and FIG. 10; and, in each of the drawings, identical or equivalent members and parts will be described with the same reference numerals (and letters) assigned thereto. FIGS. 9A, 9B are views showing a power feeding plate in a vacuum interrupter according to Embodiment 3, FIG. 9A is a front view, and FIG. 9B is a rear view. FIG. 10 is a sectional view showing an electrode structure in the vacuum interrupter according to Embodiment 3.

In contrast to the structure of the vacuum interrupter presented in the above Embodiment 1, Embodiment 3 of the present application is different only in the shape of a fixed side power feeding plate 16 or a movable side power feeding plate 20. Description will be made based on the movable side power feeding plate 20 in Embodiment 3 of the present application. As shown in FIGS. 9A, 9B, there are included a disk shaped movable side disk portion 20*a* and a movable side circular arc shaped power feeding portion 20*b* that is formed in a circular arc shape from the movable side disk portion 20*a*, as with the movable side power feeding plate 20 shown in the above Embodiment 1. Then, a movable side power feeding plate through hole 20*d* is formed in the movable side disk portion 20*a*.

The rear surface of the movable side circular arc shaped power feeding portion 20*b* is fixed to each one end in a state circumferentially conformed with respect to a movable side circular arc shaped protrusion portion 21*f* of a movable side coil electrode 21, as with the above Embodiment 1. The circumferential length of the movable side circular arc shaped protrusion portion 21*f* is shorter than the circumferential length of the movable side circular arc shaped power feeding portion 20*b*; thus, as shown in FIG. 10, a movable side air gap 27 is provided between the movable side circular arc shaped power feeding portion 20*b* that is not fixed to a movable side circular arc shaped coil portion 21*c* and the movable side circular arc shaped coil portion 21*c*, the surface of the movable side circular arc shaped power feeding portion 20*b* which is opposite to the surface fixed to the movable side circular arc shaped protrusion portion 21*f* is fixed to a movable side contact back spot facing portion 19*a*, and a movable side cavity 25 is formed between the movable side circular arc shaped power feeding portion 20*b* and the movable side contact back spot facing portion 19*a*.

An umbrella shaped movable side reinforcing member 23 having a movable side disk portion 23*a* and a movable side strut portion 23*b* is provided on the rear surface of a movable side contact 19 to reinforce the movable side contact 19, the movable side strut portion 23*b* is fixed to a movable side energization rod 6, the movable side disk portion 23*a* of the movable side reinforcing member 23 passes through the movable side power feeding plate through hole 20*d* of the movable side power feeding plate 20 and is arranged being brought into contact with the inner surface of the movable side contact back spot facing portion 19*a* of the movable side contact 19; thus, the movable side contact 19 is reinforced.

Also in this Embodiment 3, a current flowed from the movable side energization rod 6 to the movable side coil electrode 21 passes through the movable side power feeding plate 20 and flows from the movable side circular arc shaped power feeding portion 20*b* to the movable side contact 19. It becomes possible to extend a current path of the movable side circular arc shaped coil portion 21*c* of the movable side coil electrode 21 by making the movable side power feeding plate 20 have a power feeding function from the movable side coil electrode 21 to the movable side contact 19.

Furthermore, the movable side air gap 27 is provided between the movable side circular arc shaped power feeding portion 20*b* having the power feeding function and the movable side circular arc shaped coil portion 21*c*; thus, the current passes through the lower side of the movable side circular arc shaped power feeding portion 20*b*. Moreover, since the movable side cavity 25 is formed, the current is difficult to flow in a circumferential direction from the movable side circular arc shaped power feeding portion 20*b* and the current flows only in a vertical direction toward the movable side contact 19.

The movable side power feeding plate through hole 20*d* is provided in the movable side power feeding plate 20; thus, more than the above Embodiment 2, a clearance is generated in axial dimension between the movable side power feeding plate 20 and the movable side coil electrode 21 and it becomes possible to elongate the entire length of the movable side reinforcing member 23 or to increase the thickness of the movable side disk portion 23*a* of the movable side reinforcing member 23.

Here, if the diameter of the movable side power feeding plate through hole 20*d* is set to E as shown in FIGS. 9A, 9B and the outer diameter of the movable side disk portion 23*a* of the movable side reinforcing member 23 is set to D as shown in FIG. 10, it is desirable that the relationship of D E is established from the standpoint of assembly. Furthermore, it goes without saying that it is no problem to apply round machining or taper machining to an edge of each part in terms of machining.

Also in this Embodiment 3, in addition to elongation of the current path of the movable side circular arc shaped coil portion 21*c*, the current passes through the lower side of the movable side circular arc shaped power feeding portion 20*b*; thus, it becomes possible to generate an axial magnetic field also at a place having the power feeding function, an effective magnetic field area is extended, current density to be burdened per unit area of a contact surface during current interruption is reduced, and interrupting performance is improved.

Further, as with the above respective embodiments, the movable side cavity 25 is formed and the current is difficult to flow in the circumferential direction from the movable side circular arc shaped power feeding portion 20*b*; thus, an eddy current flowing in the movable side contact 19 can be suppressed while avoiding deterioration in withstand voltage performance due to providing a slit in the movable side contact 19. If the eddy current is suppressed, magnetic field strength and the effective magnetic field area are improved and the interrupting performance is improved.

Since the interrupting performance is improved, it also becomes possible to interrupt a larger current and it can contribute to an increase in current of the vacuum interrupter. Since the effective magnetic field area is extended, diffusion of electric arc of the contact surface is expedited and thermal damage of the contact surface is further reduced; thus, interrupting life is also improved and it also becomes possible to expand an application range to a large number of times of interrupting specification or the like.

Furthermore, the movable side power feeding plate through hole 20*d* is provided in the movable side power feeding plate 20; thus, more than the above Embodiment 2, the clearance is generated in axial dimension between the movable side power feeding plate 20 and the movable side coil electrode 21 and it becomes possible to elongate the entire length of the movable side reinforcing member 23, specific resistance of the movable side reinforcing member 23 is increased, and the leakage current is difficult to flow in the movable side reinforcing member 23. If the leakage current is difficult to flow, the current flowing in the movable side coil electrode 21 is increased, and it becomes possible to improve the magnetic field strength and the effective magnetic field area.

In this Embodiment 3, as with the above Embodiment 2, it may be permissible to elongate the entire length of the movable side reinforcing member 23 by increasing the thickness of the movable side disk portion 23*a* of the movable side reinforcing member 23. In this case, since the strength of the movable side reinforcing member 23 is increased, it becomes possible to expand an application range to specification in which the mass of a movable portion is heavy and high strength sustainable against contact closing impact during close-contact is required.

The movable side power feeding plate 20 in this Embodiment 3 can be manufactured easily and relatively inexpensively by press working. Cutting of the movable side power feeding plate spot facing portion 20*c* can also be performed by a relatively large edged tool and thus it is not linked to a considerable increase in cost. Additionally, if this Embodiment 3 is adopted, an area having effective magnetic flux density required by a smaller diameter than the known movable side coil electrode can be secured and thus a reduction in diameter of the movable side coil electrode is achieved.

Along with the reduction in diameter of the movable side coil electrode, a reduction in diameter of other components of the vacuum interrupter can also be performed and it can contribute to a reduction in diameter or a reduction in weight of the whole vacuum interrupter. As a matter of course, it is also linked to a reduction in cost by actualization of the reduction in diameter or the reduction in weight of the vacuum interrupter.

By the way, in the above Embodiment 3, although the description has been made based on the movable side electrode 18, the same configuration as the movable side electrode 18 can also be applied to the fixed side electrode 14 and the same effect can be exhibited. More specifically, as with the fixed side power feeding plate 16 shown in the above Embodiment 1, there are included a disk shaped fixed side disk portion 16*a* and a fixed side circular arc shaped power feeding portion 16*b* formed in a circular arc shape from the fixed side disk portion 16*a*; and it may be permissible that a fixed side power feeding plate through hole 16*d* (not shown in the drawing) is formed in the fixed side disk portion 16*a* and a fixed side disk portion 22*a* of a fixed side reinforcing member 22 is made to pass through the fixed side power feeding plate through hole 16*d* of the fixed side power feeding plate 16 and is arranged being brought into contact with the inner surface of a fixed side contact back spot facing portion 15*a* of a fixed side contact 15.

Embodiment 4

Figure 13:
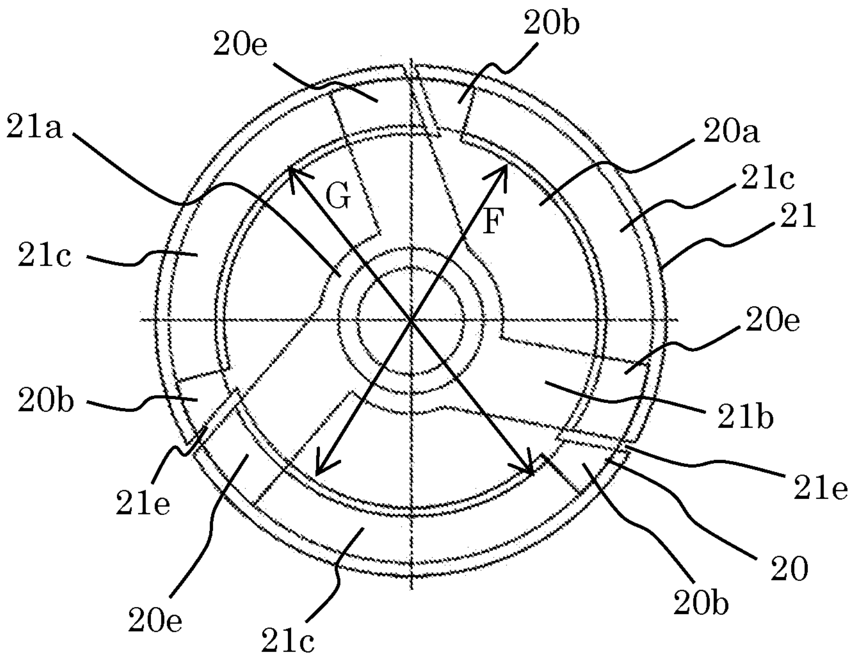
FIG. 13 is a front view showing a state where a coil electrode and the power feeding plate are fixed in the vacuum interrupter according to Embodiment 4.
Figure 14:
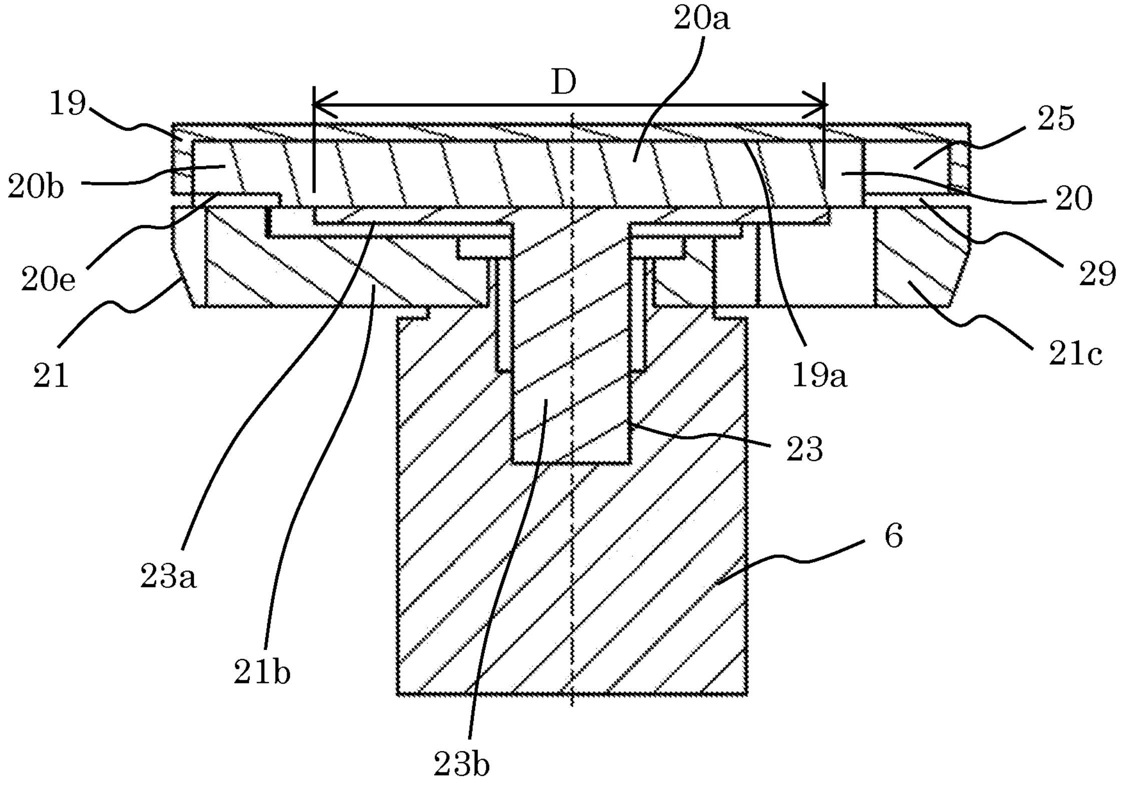
FIG. 14 is a sectional view showing an electrode structure in the vacuum interrupter according to Embodiment 4.

Embodiment 4 of the present application will be described based on FIG. 11 through FIG. 14; and, in each of the drawings, identical or equivalent members and parts will be described with the same reference numerals (and letters) assigned thereto. FIG. 11 is an exploded perspective view showing an electrode structure in a vacuum interrupter according to Embodiment 4. FIGS. 12A, 12B are views showing a power feeding plate in the vacuum interrupter according to Embodiment 4, FIG. 12A is a rear view, and FIG. 12B is a perspective view. FIG. 13 is a front view showing a state where a coil electrode and the power feeding plate are fixed in the vacuum interrupter according to Embodiment 4. FIG. 14 is a sectional view showing the electrode structure in the vacuum interrupter according to Embodiment 4.

In contrast to the structure of the vacuum interrupter presented in the above Embodiment 1, Embodiment 4 of the present application is different only in the shape of a fixed side coil electrode 17 or a movable side coil electrode 21 and a fixed side power feeding plate 16 or a movable side power feeding plate 20. Description will be made based on the movable side coil electrode 21 and the movable side power feeding plate 20 in Embodiment 4 of the present application. A movable side circular arc shaped protrusion portion 21*f* is not present in the movable side coil electrode 21 as shown in FIG. 11. As shown in FIG. 12A, 12B, the movable side power feeding plate 20 has a disk shaped movable side disk portion 20*a* and a movable side circular arc shaped power feeding portion 20*b* that is formed in a circular arc shape from the movable side disk portion 20*a*, as with the movable side power feeding plate 20 shown in the above Embodiment 1. Then, a movable side power feeding plate float portion 20*e* is provided on the rear surface of the movable side circular arc shaped power feeding portion 20*b* formed by cut or the like.

The rear surface of the movable side circular arc shaped power feeding portion 20*b* is fixed to the movable side circular arc shaped coil portion 21*c* so that inner one end of the movable side circular arc shaped power feeding portion 20*b* is made to conform circumferentially to the end surface of the movable side circular arc shaped coil portion 21*c*, as shown in FIG. 13. Furthermore, as shown in FIG. 14, a movable side float portion air gap 29 is provided between the movable side power feeding plate float portion 20*e* that is not fixed to the movable side circular arc shaped coil portion 21*c* and the movable side circular arc shaped coil portion 21*c*; a surface opposite to the surface of the movable side circular arc shaped power feeding portion 20*b* is fixed to a movable side contact back spot facing portion 19*a*; and a movable side cavity 25 is formed between the movable side circular arc shaped power feeding portion 20*b* and the movable side contact back spot facing portion 19*a*.

An umbrella shaped movable side reinforcing member 23 having a movable side disk portion 23*a* and a movable side strut portion 23*b* is provided between the movable side coil electrode 21 and the movable side power feeding plate 20 to reinforce a movable side contact 19, the movable side strut portion 23*b* is fixed to a movable side energization rod 6, and the movable side disk portion 23*a* of the movable side reinforcing member 23 is arranged being brought into contact with the rear surface of the movable side disk portion 20*a* of the movable side power feeding plate 20; thus, the movable side contact 19 is reinforced.

Also in this Embodiment 4, a current flowed from the movable side energization rod 6 to the movable side coil electrode 21 passes through the movable side power feeding plate 20 and flows from the movable side circular arc shaped power feeding portion 20*b* to the movable side contact 19. It becomes possible to extend a current path of the movable side circular arc shaped coil portion 21*c* of the movable side coil electrode 21 by making the movable side power feeding plate 20 have a power feeding function from the movable side coil electrode 21 to the movable side contact 19.

Furthermore, the movable side float portion air gap 29 is provided between the movable side power feeding plate float portion 20*e* that is formed on the movable side circular arc shaped power feeding portion 20*b* having the power feeding function and the movable side circular arc shaped coil portion 21*c*; thus, the current passes through the lower side of the movable side circular arc shaped power feeding portion 20*b*. Moreover, since the movable side cavity 25 is formed, the current is difficult to flow in a circumferential direction from the movable side circular arc shaped power feeding portion 20*b* and the current flows only in a vertical direction toward the movable side contact 19.

Here, if the outer diameter of the movable side disk portion 20*a* of the movable side power feeding plate 20 is set to F and the inner diameter of the movable side circular arc shaped coil portion 21*c* is set to G as shown in FIG. 13, it is desirable that the relationship of $F<G$ is established because the movable side disk portion 20*a* of the movable side power feeding plate 20 must not come into contact with the movable side circular arc shaped coil portion 21*c*.

In this Embodiment 4, the description has been made on the case using the shape in which the movable side power feeding plate spot facing portion 20*c* or the movable side power feeding plate through hole 20*d* as in the above Embodiment 2 or Embodiment 3 is not provided on the movable side disk portion 20*a* of the movable side power feeding plate 20. However, as a matter of course, it goes without saying that it is no problem that the movable side power feeding plate spot facing portion 20*c* or the movable side power feeding plate through hole 20*d* is provided with respect to the movable side disk portion 20*a* of the movable side power feeding plate 20 having the movable side power feeding plate float portion 20*e* to elongate the entire length of the movable side reinforcing member 23 or to thicken the movable side disk portion 23*a* of the movable side reinforcing member 23. Furthermore, it goes without saying also in this respect that it is no problem to apply round machining or taper machining to an edge of each part in terms of machining.

Also in this Embodiment 4, in addition to elongation of the current path of the movable side circular arc shaped coil portion 21*c*, the current passes through the lower side of the movable side circular arc shaped power feeding portion 20*b*; thus, it becomes possible to generate an axial magnetic field also at a place having the power feeding function, an effective magnetic field area is extended, current density to be burdened per unit area of a contact surface during current interruption is reduced, and interrupting performance is improved.

Further, as with the above respective embodiments, the movable side cavity 25 is formed and the current is difficult to flow in the circumferential direction from the movable side circular arc shaped power feeding portion 20*b*; thus, an eddy current flowing in the movable side contact 19 can be suppressed while avoiding deterioration in withstand voltage performance due to providing a slit in the movable side contact 19. If the eddy current is suppressed, magnetic field strength and the effective magnetic field area are improved and the interrupting performance is improved.

Since the interrupting performance is improved, it also becomes possible to interrupt a larger current and it can contribute to an increase in current of the vacuum interrupter. Since the effective magnetic field area is extended, diffusion of electric arc of the contact surface is expedited and thermal damage of the contact surface is further reduced; thus, interrupting life is also improved and it also becomes possible to expand an application range to a large number of times of interrupting specification or the like.

Furthermore, if the movable side power feeding plate spot facing portion 20*c* or the movable side power feeding plate through hole 20*d* is provided in the movable side power feeding plate 20, a clearance is generated in axial dimension between the movable side power feeding plate 20 and the movable side coil electrode 21, it becomes possible to elongate the entire length of the movable side reinforcing member 23, specific resistance of the movable side reinforcing member 23 is increased, and a leakage current is difficult to flow in the movable side reinforcing member 23. If the leakage current is difficult to flow, the current flowing in the movable side coil electrode 21 is increased, and it becomes possible to improve the magnetic field strength and the effective magnetic field area.

In this Embodiment 4, it may be permissible to elongate the entire length of the movable side reinforcing member 23 by increasing the thickness of the movable side disk portion 23*a* of the movable side reinforcing member 23. In this case, since the strength of the movable side reinforcing member 23 is increased, it becomes possible to expand an application range to specification in which the mass of a movable portion is heavy and high strength sustainable against contact closing impact during close-contact is required.

The movable side power feeding plate 20 in this Embodiment 4 can be manufactured easily and relatively inexpensively by press working or the like. Although the movable side power feeding plate float portion 20*e* needs to be formed by cut or the like after press working, as compared to the above Embodiments 1 to 3, the movable side circular arc shaped protrusion portion 21*f* is provided in the above Embodiment 1 to 3; thus, considering this point that cutting of the movable side circular arc shaped coil portion 21*c* needs to be performed in a wide range, there is a possibility to be more inexpensive than the above Embodiment 1 to 3 depending on the size of the movable side coil electrode.

Additionally, if this Embodiment 4 is adopted, an area having effective magnetic flux density required by a smaller diameter than the known movable side coil electrode can be secured and thus a reduction in diameter of the movable side coil electrode is achieved. Along with the reduction in diameter of the movable side coil electrode, a reduction in diameter of other components of the vacuum interrupter can also be performed and it can contribute to a reduction in diameter or a reduction in weight of the whole vacuum interrupter. As a matter of course, it is also linked to a reduction in cost by actualization of the reduction in diameter or the reduction in weight of the vacuum interrupter.

By the way, in the above Embodiment 4, although the description has been made based on the movable side electrode 18, the same configuration as the movable side electrode 18 can also be applied to the fixed side electrode 14 and the same effect can be exhibited. More specifically, as with the fixed side power feeding plate 16 shown in the above Embodiment 1, there are included a disk shaped fixed side disk portion 16*a* and a fixed side circular arc shaped power feeding portion 16*b* formed in a circular arc shape from the fixed side disk portion 16*a*; and it may be permissible that a fixed side power feeding plate float portion 16*e* (not shown in the drawing) and a fixed side float portion air gap 28 (not shown in the drawing) which are formed by cut or the like are formed on the rear surface of the fixed side circular arc shaped power feeding portion 16*b* and a fixed side disk portion 22*a* of a fixed side reinforcing member 22 is arranged being brought into contact with the fixed side disk portion 16*a* of the fixed side power feeding plate 16.

Embodiment 5

Figure 15:
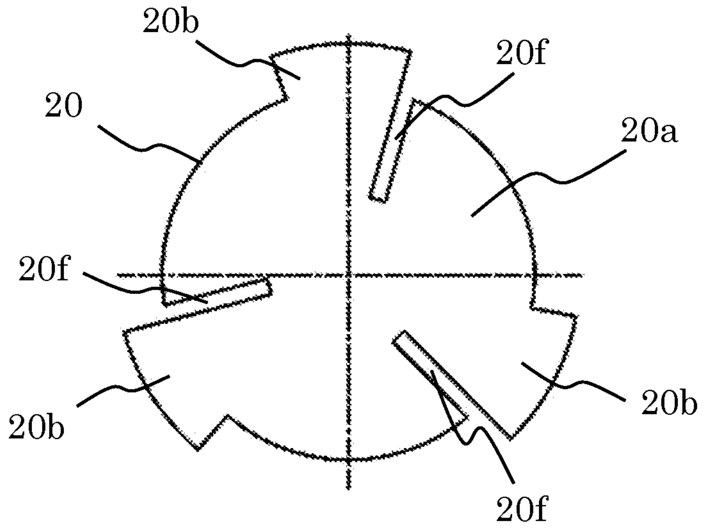
FIG. 15 is a front view showing a power feeding plate in a vacuum interrupter according to Embodiment 5.
Figure 16:
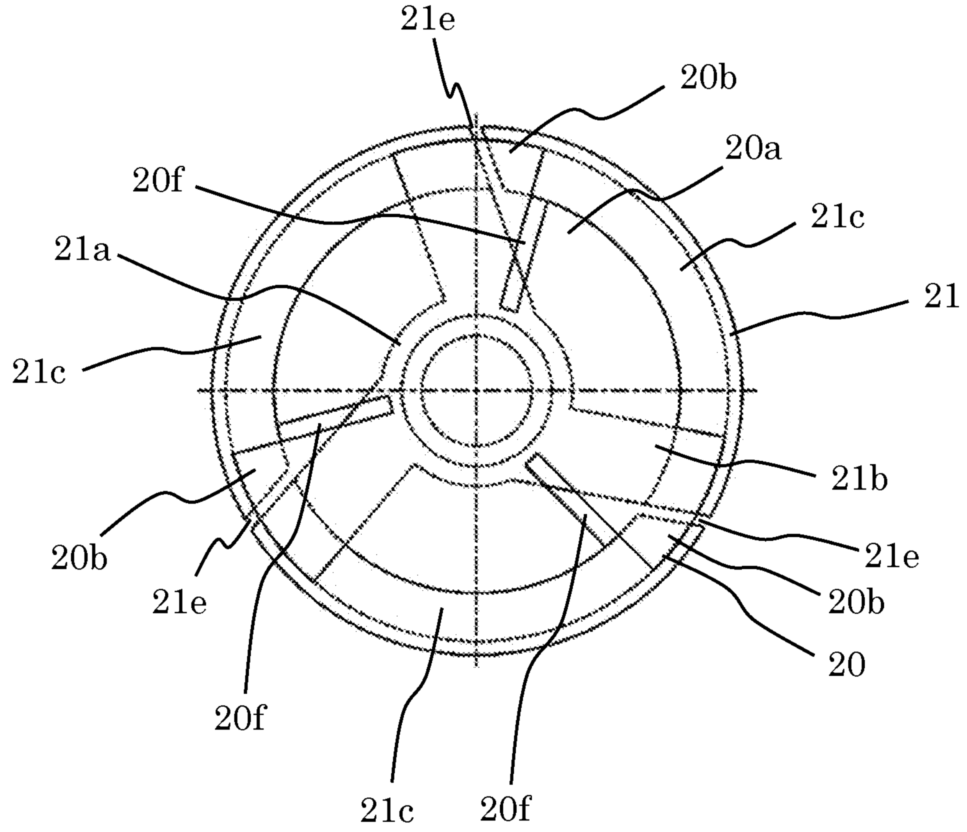
FIG. 16 is a front view showing a state where a coil electrode and the power feeding plate are fixed in the vacuum interrupter according to Embodiment 5.

Embodiment 5 of the present application will be described based on FIG. 15 and FIG. 16; and, in each of the drawings, identical or equivalent members and parts will be described with the same reference numerals (and letters) assigned thereto. FIG. 15 is a front view showing a power feeding plate in a vacuum interrupter according to Embodiment 5. FIG. 16 is a front view showing a state where a coil electrode and the power feeding plate are fixed in the vacuum interrupter according to Embodiment 5.

In contrast to the structure of the vacuum interrupter presented in the above Embodiment 1, Embodiment 5 of the present application is different only in the shape of a fixed side power feeding plate 16 or a movable side power feeding plate 20. Description will be made based on the movable side power feeding plate 20 in Embodiment 5 of the present application. As shown in FIG. 15, the movable side power feeding plate 20 has a disk shaped movable side disk portion 20*a* and a movable side circular arc shaped power feeding portion 20*b* that is formed in a circular arc shape from the movable side disk portion 20*a*, as with the movable side power feeding plate 20 shown in the above Embodiment 1. Then, in Embodiment 5, a movable side power feeding plate slit 20*f* led so as to be along one end of the movable side circular arc shaped power feeding portion 20*b* is provided in the movable side disk portion 20*a* of the movable side power feeding plate 20.

A movable side coil electrode 21 and the movable side power feeding plate 20 are fixed as with the above Embodiment 1. As shown in FIG. 16, one end of a movable side circular arc shaped protrusion portion 21*f* of the movable side coil electrode 21 is arranged so as to conform to one end on the side along the movable side power feeding plate slit 20*f* of the movable side circular arc shaped power feeding portion 20*b* of the movable side power feeding plate 20. In contrast to the above Embodiment 1, since the only difference is that the movable side power feeding plate slit 20*f* is provided in the movable side power feeding plate 20, a movable side air gap 27 between the movable side circular arc shaped power feeding portion 20*b* and a movable side circular arc shaped coil portion 21*c* or a movable side cavity 25 between the movable side circular arc shaped power feeding portion 20*b* and a movable side contact back spot facing portion 19*a* is also formed in the same manner.

It is also the same that an umbrella shaped movable side reinforcing member 23 having a movable side disk portion 23*a* and a movable side strut portion 23*b* is provided between the movable side coil electrode 21 and the movable side power feeding plate 20 to reinforce a movable side contact 19, the movable side strut portion 23*b* is fixed to a movable side energization rod 6, and the movable side disk portion 23*a* is arranged being brought into contact with the movable side disk portion 20*a* of the movable side power feeding plate 20; thus, the movable side contact 19 is reinforced.

Also in this Embodiment 5, a current flowed from the movable side energization rod 6 to the movable side coil electrode 21 passes through the movable side power feeding plate 20 and flows from the movable side circular arc shaped power feeding portion 20*b* to the movable side contact 19. It becomes possible to extend a current path of the movable side circular arc shaped coil portion 21*c* of the movable side coil electrode 21 by making the movable side power feeding plate 20 have a power feeding function from the movable side coil electrode 21 to the movable side contact 19.

Furthermore, the movable side air gap 27 is provided between the movable side circular arc shaped power feeding portion 20*b* having the power feeding function and the movable side circular arc shaped coil portion 21*c*; thus, the current passes through the lower side of the movable side circular arc shaped power feeding portion 20*b*. Moreover, since the movable side cavity 25 is formed, the current is difficult to flow in a circumferential direction from the movable side circular arc shaped power feeding portion 20*b* and the current flows only in a vertical direction toward the movable side contact 19.

In this Embodiment 5, the description has been made on the case using the shape in which the movable side power feeding plate spot facing portion 20*c* or the movable side power feeding plate through hole 20*d* as in the above Embodiment 2 or Embodiment 3 is not provided on the movable side disk portion 20*a* of the movable side power feeding plate 20; however, as a matter of course, it goes without saying that it is no problem that the movable side power feeding plate spot facing portion 20*c* or the movable side power feeding plate through hole 20*d* is provided with respect to the movable side disk portion 20*a* of the movable side power feeding plate 20 having the movable side power feeding plate slit 20*f* to elongate the entire length of the movable side reinforcing member 23 or to thicken the movable side disk portion 23*a* of the movable side reinforcing member 23.

Furthermore, as in the above Embodiment 4, a movable side power feeding plate float portion 20*e* can also be provided on the rear surface of the movable side circular arc shaped power feeding portion 20*b* of the movable side power feeding plate 20 of this Embodiment 5. Furthermore, it goes without saying also in this respect that it is no problem to apply round machining or taper machining to an edge of each part in terms of machining.

Also in this Embodiment 5, in addition to elongation of the current path of the movable side circular arc shaped coil portion 21*c*, the current passes through the lower side of the movable side circular arc shaped power feeding portion 20*b*; thus, it becomes possible to generate an axial magnetic field also at a place having the power feeding function, an effective magnetic field area is extended, current density to be burdened per unit area of a contact surface during current interruption is reduced, and interrupting performance is improved.

Further, the movable side cavity 25 is formed as with the above respective embodiments. Then, in this Embodiment, the movable side power feeding plate slit 20*f* is provided and the current is difficult to flow across a wider range in the circumferential direction from the movable side circular arc shaped power feeding portion 20*b*; thus, an eddy current flowing in the movable side contact 19 can be suppressed while avoiding deterioration in withstand voltage performance due to providing a slit in the movable side contact 19.

If the eddy current is suppressed, magnetic field strength and the effective magnetic field area are improved and the interrupting performance is improved. Since the interrupting performance is improved, it also becomes possible to interrupt a larger current and it can contribute to an increase in current of the vacuum interrupter. Since the effective magnetic field area is extended, diffusion of electric arc of the contact surface is expedited and thermal damage of the contact surface is further reduced; thus, interrupting life is also improved and it also becomes possible to expand an application range to a large number of times of interrupting specification or the like.

Furthermore, if the movable side power feeding plate spot facing portion 20*c* or the movable side power feeding plate through hole 20*d* is provided in the movable side power feeding plate 20, a clearance is generated in axial dimension between the movable side power feeding plate 20 and the movable side coil electrode 21, it becomes possible to elongate the entire length of the movable side reinforcing member 23, specific resistance of the movable side reinforcing member 23 is increased, and a leakage current is difficult to flow in the movable side reinforcing member 23. If the leakage current is difficult to flow, the current flowing in the movable side coil electrode 21 is increased, and it becomes possible to improve the magnetic field strength and the effective magnetic field area.

In this Embodiment 5, it may be permissible to elongate the entire length of the movable side reinforcing member 23 by increasing the thickness of the movable side disk portion 23*a* of the movable side reinforcing member 23. In this case, since the strength of the movable side reinforcing member 23 is increased, it becomes possible to expand an application range to specification in which the mass of a movable portion is heavy and high strength sustainable against contact closing impact during close-contact is required.

The movable side power feeding plate 20 in this Embodiment 5 is to merely form the movable side power feeding plate slit 20*f* by means of a saw or the like after the movable side disk portion 20*a* and the movable side circular arc shaped power feeding portion 20*b* are formed by press working; thus, it can be manufactured relatively inexpensively.

Additionally, if this Embodiment 5 is adopted, an area having effective magnetic flux density required by a smaller diameter than the known movable side coil electrode can be secured and thus a reduction in diameter of the movable side coil electrode is achieved. Along with the reduction in diameter of the movable side coil electrode, a reduction in diameter of other components of the vacuum interrupter can also be performed and it can contribute to a reduction in diameter or a reduction in weight of the whole vacuum interrupter. As a matter of course, it is also linked to a reduction in cost by actualization of the reduction in diameter or the reduction in weight of the vacuum interrupter.

By the way, in the above Embodiment 5, although the description has been made based on a movable side electrode 18, the same configuration as the movable side electrode 18 can also be applied to a fixed side electrode 14 and the same effect can be exhibited. More specifically, as with the fixed side power feeding plate 16 shown in the above Embodiment 1, there are included a disk shaped fixed side disk portion 16*a* and a fixed side circular arc shaped power feeding portion 16*b* formed in a circular arc shape from the fixed side disk portion 16*a*; and it may be permissible that a fixed side power feeding plate slit 16*f* (not shown in the drawing) led so as to be along one end of the fixed side circular arc shaped power feeding portion 16*b* is formed in the fixed side disk portion 16*a* and a fixed side disk portion 22*a* of a fixed side reinforcing member 22 is arranged being brought into contact with the fixed side disk portion 16*a* of the fixed side power feeding plate 16.

Embodiment 6

Figure 17:
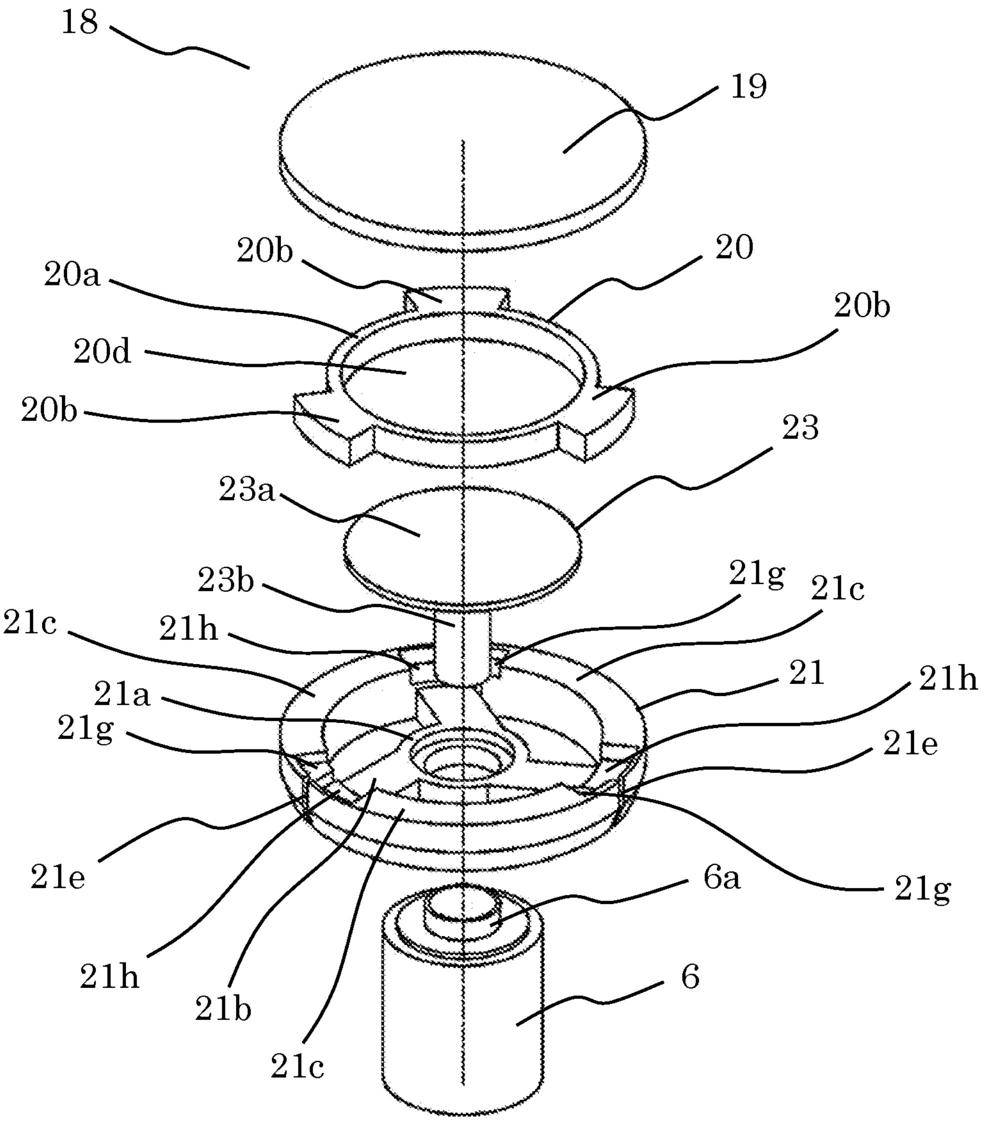
FIG. 17 is an exploded perspective view showing an electrode structure in a vacuum interrupter according to Embodiment 6.
Figure 18A:
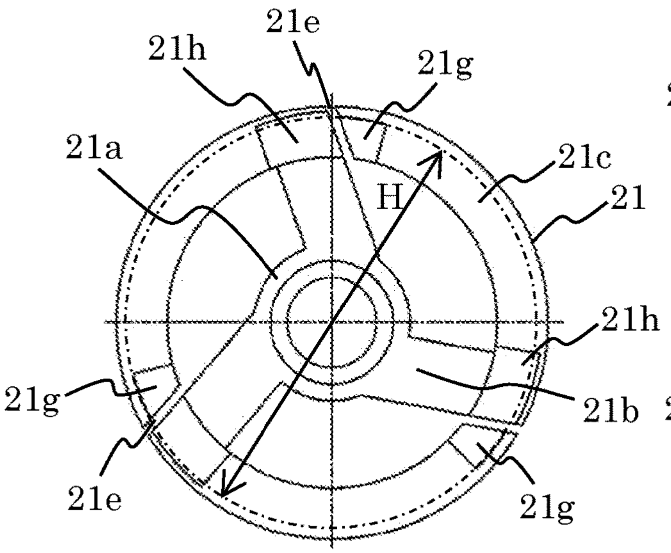
FIGS. 18A, 18B are views showing a coil electrode in a vacuum interrupter according to Embodiment 6.
Figure 18B:
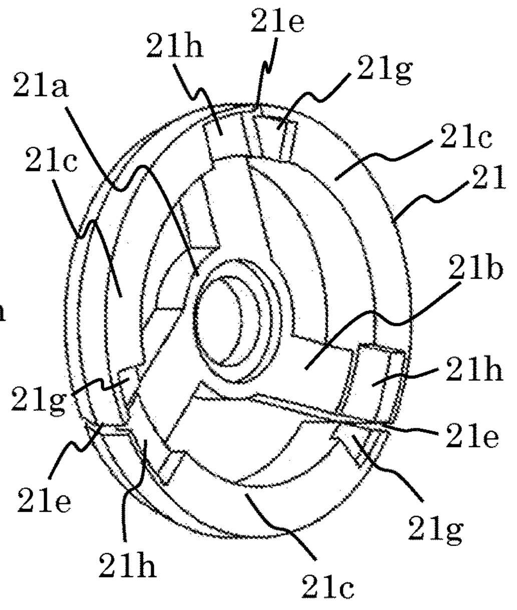
Figure 19:
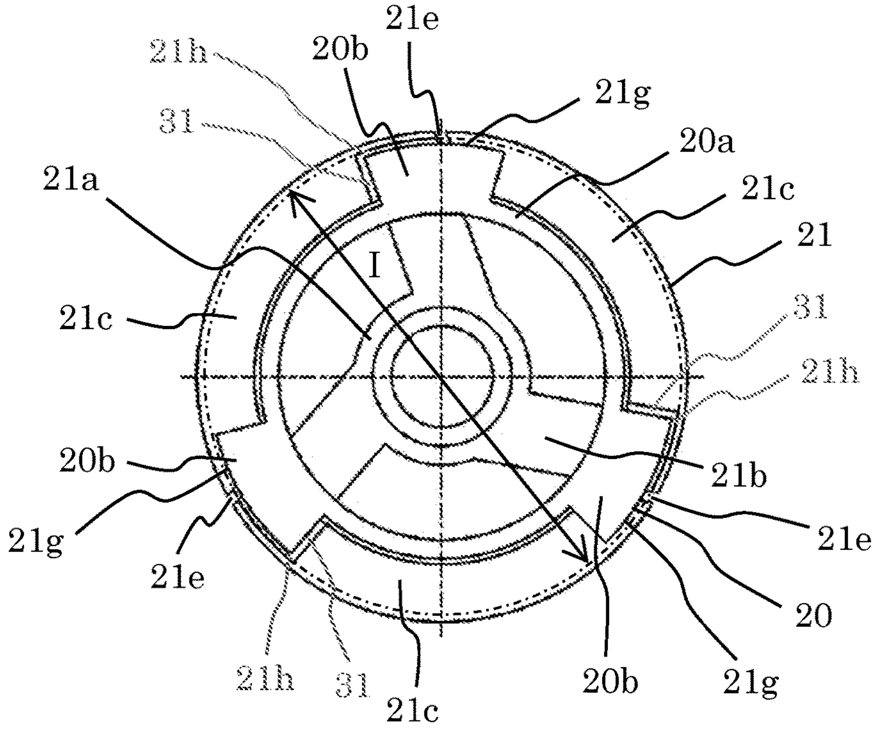
FIG. 19 is a front view showing a state where the coil electrode and a power feeding plate are fixed in the vacuum interrupter according to Embodiment 6.
Figure 20:
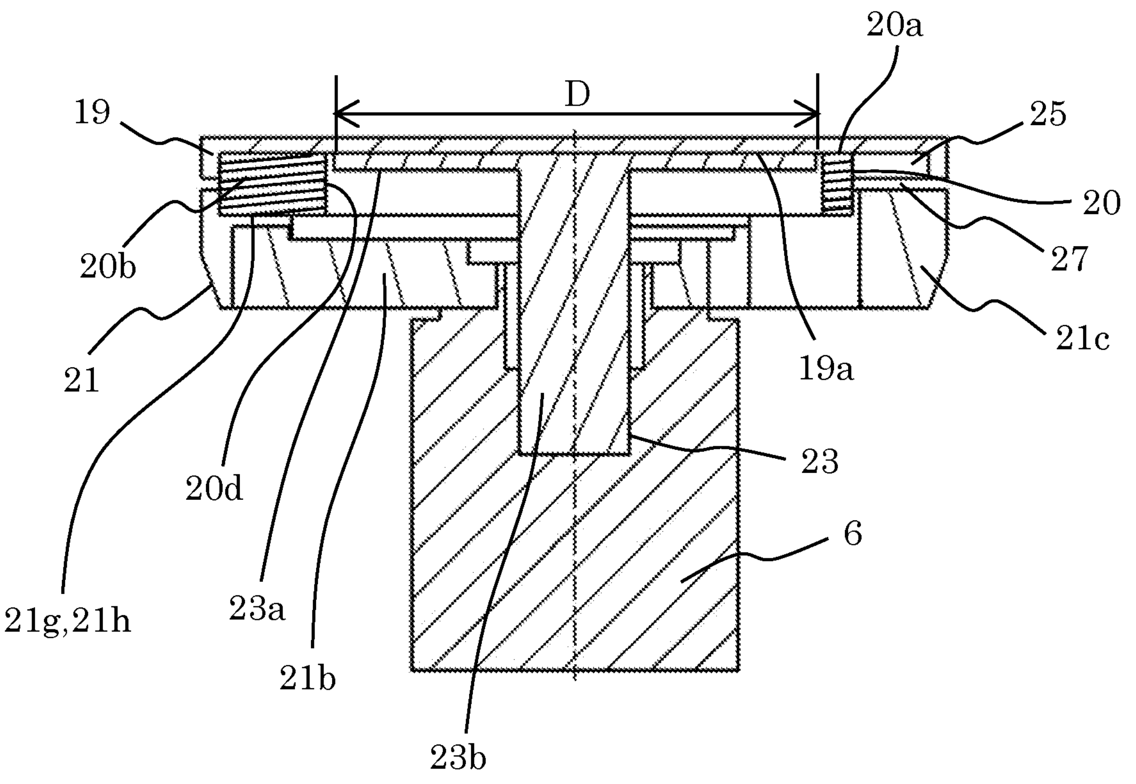
FIG. 20 is a sectional view showing the electrode structure in the vacuum interrupter according to Embodiment 6.

Embodiment 6 of the present application will be described based on FIG. 17 through FIG. 20; and, in each of the drawings, identical or equivalent members and parts will be described with the same reference numerals (and letters) assigned thereto. FIG. 17 is an exploded perspective view showing an electrode structure in a vacuum interrupter according to Embodiment 6. FIGS. 18A, 18B are views showing a coil electrode in the vacuum interrupter according to Embodiment 6, FIG. 18A is a front view, and FIG. 18B is a perspective view. FIG. 19 is a front view showing a state where the coil electrode and a power feeding plate are fixed in the vacuum interrupter according to Embodiment 6. FIG. 20 is a sectional view showing the electrode structure in the vacuum interrupter according to Embodiment 6.

In contrast to the structure of the vacuum interrupter presented in the above Embodiment 1 to 3, Embodiment 6 of the present application is different only in the shape of a fixed side coil electrode 17 or a movable side coil electrode 21. Description will be made based on the movable side coil electrode 21 in Embodiment 6 of the present application. For the sake of simplicity, as shown in FIG. 17, this Embodiment 6 will be described on the case where a movable side power feeding plate through hole 20*d* is provided in a movable side disk portion 20*a* of a movable side power feeding plate 20 as in the above Embodiment 3.

In the movable side coil electrode 21 in this Embodiment 6, as shown in FIG. 17 or FIGS. 18A, 18B, a movable side circular arc shaped first groove portion 21*g* is formed on a termination end portion of a movable side circular arc shaped coil portion 21*c* of the movable side coil electrode 21; a movable side circular arc shaped second groove portion 21*h* that is deeper than the depth of the movable side circular arc shaped first groove portion 21*g* is formed on a beginning end portion of the movable side circular arc shaped coil portion 21*c* of the movable side coil electrode 21 which sandwiches a movable side slit 21*e*, that is, at a position where a movable side lateral arm portion 21*b* of the movable side coil electrode 21 intersects with the movable side circular arc shaped coil portion 21*c*; a movable side circular arc shaped power feeding portion 20*b* of the movable side power feeding plate 20 is arranged over the movable side circular arc shaped first groove portion 21*g* and the movable side circular arc shaped second groove portion 21*h*; the movable side circular arc shaped power feeding portion 20*b* of the movable side power feeding plate 20 is fixed to the movable side circular arc shaped first groove portion 21*g*; and a movable side groove portion air gap 31 is formed between the movable side circular arc shaped power feeding portion 20*b* of the movable side power feeding plate 20 and the movable side circular arc shaped second groove portion 21*h*.

Here, if the outer diameter of the movable side circular arc shaped power feeding portion 20*b* is set to A, the outer diameter of the movable side circular arc shaped first groove portion 21*g* is set to H as shown in FIGS. 18A, 18B, and the outer diameter of the movable side circular arc shaped second groove portion 21*h* is set to I as shown in FIG. 19, it is desirable to set dimensions so as to establish the relationship of $A \leq H < I$. The movable side circular arc shaped power feeding portion 20*b* undertakes power feeding between the movable side coil electrode 21 and a movable side contact 19; thus, the above dimensional relationship is set and the rear surface of the movable side circular arc shaped power feeding portion 20*b* is fixed to the movable side circular arc shaped first groove portion 21*g* as shown in FIG. 19.

Meanwhile, the depth of the movable side circular arc shaped second groove portion 21*h* is deeper than the depth of the movable side circular arc shaped first groove portion 21*g*, it is in the above dimensional relationship, and, as in FIG. 19, the groove width of the movable side circular arc shaped second groove portion 21*h* is set wide so as not to come into contact with the end surface on the side that does not come into contact with the movable side circular arc shaped first groove portion 21*g* of the movable side circular arc shaped power feeding portion 20*b*; thus, the movable side circular arc shaped second groove portion 21*h* does not come into contact with the movable side circular arc shaped power feeding portion 20*b*. Therefore, as shown in FIG. 19, a movable side groove portion air gap 31 is formed between the movable side circular arc shaped power feeding portion 20*b* and the movable side circular arc shaped second groove portion 21*h*.

The movable side circular arc shaped power feeding portion 20*b* of a surface that does not come into contact with the movable side circular arc shaped first groove portion 21*g* is fixed to a movable side contact back spot facing portion 19*a*; however, something to be fixed is not present in the circumferential direction of the movable side circular arc shaped power feeding portion 20*b* and thus a movable side cavity 25 is formed as shown in FIG. 20. An umbrella shaped movable side reinforcing member 23 having a movable side disk portion 23*a* and a movable side strut portion 23*b* is provided between the movable side coil electrode 21 and the movable side power feeding plate 20 to reinforce a movable side contact 19, the movable side strut portion 23*b* is fixed to a movable side energization rod 6, and the movable side disk portion 23*a* of the movable side reinforcing member 23 passes through the movable side power feeding plate through hole 20*d* of the movable side power feeding plate 20 and is arranged being brought into contact with the inner surface of the movable side contact back spot facing portion 19*a* of the movable side contact 19; thus, the movable side contact 19 is reinforced.

Also in this Embodiment 6, a current flowed from the movable side energization rod 6 to the movable side coil electrode 21 passes through the movable side power feeding plate 20 and flows from the movable side circular arc shaped power feeding portion 20*b* to the movable side contact 19. It becomes possible to extend a current path of the movable side circular arc shaped coil portion 21*c* of the movable side coil electrode 21 by making the movable side power feeding plate 20 have a power feeding function from the movable side coil electrode 21 to the movable side contact 19.

Furthermore, the movable side groove portion air gap 31 is provided between the movable side circular arc shaped power feeding portion 20*b* having the power feeding function and the movable side circular arc shaped second groove portion 21*h*; thus, the current passes through the lower side of the movable side circular arc shaped power feeding portion 20*b*. Moreover, since the movable side cavity 25 is formed, the current is difficult to flow in the circumferential direction from the movable side circular arc shaped power feeding portion 20*b* and the current flows only in a vertical direction toward the movable side contact 19.

In this Embodiment 6, the description has been made on the configuration of the case where the movable side power feeding plate through hole 20*d* is provided in the movable side disk portion 20*a* of the movable side power feeding plate 20; however, it may be permissible to use the movable side power feeding plate 20 in which any additional machining is not applied to the movable side disk portion 20*a* as in the above Embodiment 1, or it may be permissible to use the movable side power feeding plate 20 in which the movable side power feeding plate spot facing portion 20*c* is provided as in the above Embodiment 2. As a matter of course, it goes without saying that it may be permissible to use the movable side power feeding plate 20 having a movable side power feeding plate slit 20*f* shown in the above Embodiment 5. It goes without saying also in this respect that it is no problem to apply round machining or taper machining to an edge of each part in terms of machining.

Also in this Embodiment 6, in addition to elongation of the current path of the movable side circular arc shaped coil portion 21*c*, the current passes through the lower side of the movable side circular arc shaped power feeding portion 20*b*; thus, it becomes possible to generate an axial magnetic field also at a place having the power feeding function, an effective magnetic field area is extended, current density to be burdened per unit area of a contact surface during current interruption is reduced, and interrupting performance is improved.

Further, as with the above respective embodiments, the movable side cavity 25 is formed and the current is difficult to flow in the circumferential direction from the movable side circular arc shaped power feeding portion 20*b*; thus, an eddy current flowing in the movable side contact 19 can be suppressed more efficiently while avoiding deterioration in withstand voltage performance due to providing a slit in the movable side contact 19.

If the eddy current is suppressed, magnetic field strength and the effective magnetic field area are improved and the interrupting performance is improved. In this Embodiment 6, the height of the movable side power feeding plate 20 that protrudes from the movable side circular arc shaped coil portion 21*c* is low and therefore it becomes applicable to a thin movable side contact 19. In this case, the distance between the movable side circular arc shaped coil portion 21*c* and the surface of the movable side contact 19 is shortened, therefore, the strength of the axial magnetic field generated in the surface of the movable side contact 19 is enhanced and the interrupting performance is further improved.

Since the interrupting performance is improved, it also becomes possible to interrupt a larger current and it can contribute to an increase in current of the vacuum interrupter. Since the effective magnetic field area is extended, diffusion of electric arc of the contact surface is expedited and thermal damage of the contact surface is further reduced; thus, interrupting life is also improved and it also becomes possible to expand an application range to a large number of times of interrupting specification or the like.

The movable side coil electrode 21 in this Embodiment 6 needs to form the movable side circular arc shaped first groove portion 21*g* and the movable side circular arc shaped second groove portion 21*h* by cutting; however, considering that the whole movable side circular arc shaped coil portion 21*c* is processed so as to remain the movable side circular arc shaped protrusion portion 21*f* by the movable side coil electrode 21 as in the above Embodiment 1 to 3 and Embodiment 5, there is a possibility to become inexpensive by forming the movable side circular arc shaped first groove portion 21*g* and the movable side circular arc shaped second groove portion 21*h* by cutting.

Additionally, if this Embodiment 6 is adopted, an area having effective magnetic flux density required by a smaller diameter than the known movable side coil electrode can be secured and thus a reduction in diameter of the movable side coil electrode is achieved. Along with the reduction in diameter of the movable side coil electrode, a reduction in diameter of other components of the vacuum interrupter can also be performed and it can contribute to a reduction in diameter or a reduction in weight of the whole vacuum interrupter. As a matter of course, it is also linked to a reduction in cost by actualization of the reduction in diameter or the reduction in weight of the vacuum interrupter.

By the way, in the above Embodiment 6, although the description has been made based on the movable side electrode 18, the same configuration as the movable side electrode 18 can also be applied to a fixed side electrode 14 and the same effect can be exhibited. More specifically, as with the fixed side power feeding plate 16 shown in the above Embodiment 1, there are included a disk shaped fixed side disk portion 16*a* and a fixed side circular arc shaped power feeding portion 16*b* formed in a circular arc shape from the fixed side disk portion 16*a*; and it may be permissible that a fixed side circular arc shaped first groove portion 17*g* (not shown in the drawing) is formed on a termination end portion of a fixed side circular arc shaped coil portion 17*c* of a fixed side coil electrode 17, a fixed side circular arc shaped second groove portion 17*h* (not shown in the drawing) that is deeper than the depth of a fixed side circular arc shaped first groove portion 17*g* is formed on a beginning end portion of the fixed side circular arc shaped coil portion 17*c* of the fixed side coil electrode 17 which sandwiches a fixed side slit 17*e* (not shown in the drawing), that is, at a position where a fixed side lateral arm portion 17*b* of the fixed side coil electrode 17 intersects with the fixed side circular arc shaped coil portion 17*c*, the fixed side circular arc shaped power feeding portion 16*b* of the fixed side power feeding plate 16 is arranged over the fixed side circular arc shaped first groove portion 17*g* and the fixed side circular arc shaped second groove portion 17*h*, a fixed side groove portion air gap 30 (not shown in the drawing) is formed between the fixed side circular arc shaped power feeding portion 16*b* of the fixed side power feeding plate 16 and the fixed side circular arc shaped second groove portion 17*h*, and a fixed side disk portion 22*a* of a fixed side reinforcing member 22 is made to pass through a fixed side power feeding plate through hole 16*d* of the fixed side power feeding plate 16 and is arranged being brought into contact with the inner surface of a fixed side contact back spot facing portion 15*a* of a fixed side contact 15.

The present application describes various exemplified embodiments and examples; however, various features, aspects, and functions described in one or a plurality of embodiments are not limited to specific embodiments, but are applicable to embodiments individually or in various combinations thereof. Therefore, countless modified examples not exemplified are assumed in technical ranges disclosed in the specification of the present application. For example, there include: a case in which at least one constitutional element is modified; a case, added; or a case, omitted; and a case in which at least one constitutional element is extracted to combine with constitutional elements of other embodiments.

INDUSTRIAL APPLICABILITY

The present application is suitable for actualizing a vacuum interrupter which can secure an effective magnetic field area and can improve current interrupting performance.

DESCRIPTION OF REFERENCE NUMERALS

1 Insulation cylinder, 2 Fixed side flange, 3 Movable side flange, 5 Fixed side energization rod, 6 Movable side energization rod, 14 Fixed side electrode, 15 Fixed side contact, 15*a* Fixed side contact back spot facing portion, 16 Fixed side power feeding plate, 16*a* Fixed side disk portion, 16*b* Fixed side circular arc shaped power feeding portion, 16*c* Fixed side power feeding plate spot facing portion, 16*d* Fixed side power feeding plate through hole, 16*e* Fixed side power feeding plate float portion, 16*f* Fixed side power feeding plate slit, 17 Fixed side coil electrode, 17*a* Fixed side coil electrode fitting portion, 17*b* Fixed side lateral arm portion, 17*c* Fixed side circular arc shaped coil portion, 17*e* Fixed side slit, 17*f* Fixed side circular arc shaped protrusion portion, 17*g* Fixed side circular arc shaped first groove portion, 17*h* Fixed side circular arc shaped second groove portion, 18 Movable side electrode, 19 Movable side contact, 19*a* Movable side contact back spot facing portion, 20 Movable side power feeding plate, 20*a* Movable side disk portion, 20*b* Movable side circular arc shaped power feeding portion, 20*c* Movable side power feeding plate spot facing portion, 20*d* Movable side power feeding plate through hole, 20*e* Movable side power feeding plate float portion, 20*f* Movable side power feeding plate slit, 21 Movable side coil electrode, 21*a* Movable side coil electrode fitting portion, 21*b* Movable side lateral arm portion, 21*c* Movable side circular arc shaped coil portion, 21*e* Movable side slit, 21*f* Movable side circular arc shaped protrusion portion, 21*g* Movable side circular arc shaped first groove portion, 21*h* Movable side circular arc shaped second groove portion, 22 Fixed side reinforcing member, 22*a* Fixed side disk portion, 22*b* Fixed side strut portion, 23 Movable side reinforcing member, 23*a* Movable side disk portion, 23*b* Movable side strut portion, 24 Fixed side cavity, 25 Movable side cavity, 26 Fixed side air gap, 27 Movable side air gap, 28 Fixed side float portion air gap, 29 Movable side float portion air gap, 30 Fixed side groove portion air gap, 31 Movable side groove portion air gap

The invention claimed is:

1. A vacuum interrupter comprising:

a cylindrical insulation container, a fixed side electrode arranged in an inside of the insulation container, and a movable side electrode which is arranged in the inside of the insulation container and is brought into contact with and separated from the fixed side electrode, wherein the fixed side electrode and the movable side electrode each have a contact;

at least either the fixed side electrode or the movable side electrode includes: a power feeding plate having a circular arc shaped power feeding portion formed on an outer circumference of a disk portion, and a coil electrode in which a circular arc shaped coil portion along an outer circumferential edge of the contact is arranged being divided in plurality by a slit on a rear surface side of the power feeding plate and in which a circular arc protrusion portion whose circumferential length is shorter than a circumferential length of a circular arc shaped portion of the circular arc shaped power feeding portion is fixed at a position of the circular arc shaped coil portion, the position being faced to the circular arc shaped power feeding portion; and wherein when the power feeding plate and the coil electrode are provided on the fixed side electrode, the fixed side electrode includes: a fixed side contact which is formed in a disk shape and is formed with a fixed side contact back spot facing portion on a back surface, a fixed side power feeding plate which is fixed to an inner surface of the fixed side contact back spot facing portion of the fixed side contact and has a fixed side circular arc shaped power feeding portion formed on an outer circumference of a disk shaped fixed side disk portion along an outer circumferential edge, and a fixed side coil electrode in which a fixed side circular arc shaped coil portion along an outer circumferential edge of the fixed side contact is arranged being divided in plurality by a fixed side slit on a rear surface side of the fixed side power feeding plate, the fixed side coil electrode having a fixed side circular arc shaped protrusion portion of a circular arc shaped portion whose circumferential length is shorter than a circumferential length of a circular arc shaped portion of the fixed side circular arc shaped power feeding portion, the fixed side circular arc shaped protrusion portion being fixed at a position of the fixed side circular arc shaped coil portion, the position being faced to the fixed side circular arc shaped power feeding portion;

a fixed side reinforcing member, which has a fixed side disk portion and a fixed side strut portion, in which the fixed side disk portion is brought into contact with the fixed side power feeding plate, and in which the fixed side strut portion is fixed to a fixed side energization rod, is included;

a fixed side cavity is formed between the fixed side contact back spot facing portion and the fixed side circular arc shaped power feeding portion, and a fixed side air gap is formed between the fixed side circular arc shaped coil portion and the fixed side circular arc shaped power feeding portion; and wherein when the power feeding plate and the coil electrode are provided on the movable side electrode, the movable side electrode includes: a movable side contact which is formed in a disk shape and is formed with a movable side contact back spot facing portion on a back surface, a movable side power feeding plate which is fixed to an inner surface of the movable side contact back spot facing portion of the movable side contact and has a movable side circular arc shaped power feeding portion formed on an outer circumference of a disk shaped movable side disk portion along an outer circumferential edge, and a movable side coil electrode in which a movable side circular arc shaped coil portion along an outer circumferential edge of the movable side contact is arranged being divided in plurality by a movable side slit on a rear surface side of the movable side power feeding plate, the movable side coil electrode having a movable side circular arc shaped protrusion portion of a circular arc shaped portion whose circumferential length is shorter than a circumferential length of a circular arc shaped portion of the movable side circular arc shaped power feeding portion, the movable side circular arc shaped protrusion portion being fixed at a position of the movable side circular arc shaped coil portion, the position being faced to the movable side circular arc shaped power feeding portion;

a movable side reinforcing member, which has a movable side disk portion and a movable side strut portion, in which the movable side disk portion is brought into contact with the movable side power feeding plate, and in which the movable side strut portion is fixed to a movable side energization rod, is included; and a movable side cavity is formed between the movable side contact back spot facing portion and the movable side circular arc shaped power feeding portion, and a movable side air gap is formed between the movable side circular arc shaped coil portion and the movable side circular arc shaped power feeding portion.

2. The vacuum interrupter according to claim 1, wherein an outer diameter of the fixed side circular arc shaped power feeding portion of the fixed side power feeding plate is the less than or equal to an inner diameter of the fixed side contact back spot facing portion, or an outer diameter of the movable side circular arc shaped power feeding portion of the movable side power feeding plate is less than or equal to an inner diameter of the movable side contact back spot facing portion.

3. The vacuum interrupter according to claim 1, wherein a fixed side power feeding plate spot facing portion is formed on the back surface of the fixed side disk portion of the fixed side power feeding plate and the fixed side disk portion of the fixed side reinforcing member is brought into contact with the fixed side power feeding plate spot facing portion, or a movable side power feeding plate spot facing portion is formed on the back surface of the movable side disk portion of the movable side power feeding plate and the movable side disk portion of the movable side reinforcing member is brought into contact with the movable side power feeding plate spot facing portion.

4. The vacuum interrupter according to claim 3, wherein an inner diameter of the fixed side power feeding plate spot facing portion of the fixed side power feeding plate is greater than or equal to an outer diameter of the fixed side disk portion of the fixed side reinforcing member, or an inner diameter of the movable side power feeding plate spot facing portion of the movable side power feeding plate is greater than or equal to an outer diameter of the movable side disk portion of the movable side reinforcing member.

5. The vacuum interrupter according to claim 1, wherein a circular fixed side through hole is formed in the fixed side disk portion of the fixed side power feeding plate and the fixed side disk portion of the fixed side reinforcing member is inserted through the fixed side through hole and is arranged on the fixed side contact back spot facing portion, or a circular movable side through hole is formed in the movable side disk portion of the movable side power feeding plate and the movable side disk portion of the movable side reinforcing member is inserted through the movable side through hole and is arranged on the movable side contact back spot facing portion.

6. The vacuum interrupter according to claim 5, wherein an inner diameter of the fixed side through hole of the fixed side power feeding plate is greater than or equal to an outer diameter of the fixed side disk portion of the fixed side reinforcing member, or an inner diameter of the movable side through hole of the movable side power feeding plate is greater than or equal to an outer diameter of the movable side disk portion of the movable side reinforcing member.

7. The vacuum interrupter according to claim 1, wherein a fixed side power feeding plate slit that is led to one end of the fixed side circular arc shaped power feeding portion of the fixed side power feeding plate is formed in the fixed side disk portion of the fixed side power feeding plate, or a movable side power feeding plate slit that is led to one end of the movable side circular arc shaped power feeding portion of the movable side power feeding plate is formed in the movable side disk portion of the movable side power feeding plate.

8. A vacuum interrupter comprising:

a cylindrical insulation container, a fixed side electrode arranged in an inside of the insulation container, and a movable side electrode which is arranged in the inside of the insulation container and is brought into contact with and separated from the fixed side electrode, wherein the fixed side electrode and the movable side electrode each have a contact;

at least either the fixed side electrode or the movable side electrode includes: a power feeding plate having a circular arc shaped power feeding portion formed on an outer circumference of a disk portion, and a coil electrode in which a circular arc shaped coil portion along an outer circumferential edge of the contact is arranged being divided in plurality by a slit on a rear surface side of the power feeding plate and in which a circular arc protrusion portion whose circumferential length is shorter than a circumferential length of a circular arc shaped portion of the circular arc shaped power feeding portion is fixed at a position of the circular arc shaped coil portion, the position being faced to the circular arc shaped power feeding portion; and wherein when the power feeding plate and the coil electrode are provided on the fixed side electrode, the fixed side electrode includes: a fixed side contact which is formed in a disk shape and is formed with a fixed side contact back spot facing portion on a back surface, a fixed side power feeding plate which is fixed to an inner surface of the fixed side contact back spot facing portion of the fixed side contact and has a fixed side circular arc shaped power feeding portion formed on an outer circumference of a disk shaped fixed side disk portion along an outer circumferential edge, and a fixed side coil electrode in which a fixed side circular arc shaped coil portion along an outer circumferential edge of the fixed side contact is arranged being divided in plurality by a fixed side slit on a rear surface side of the fixed side power feeding plate;

a fixed side reinforcing member, which has a fixed side disk portion and a fixed side strut portion, in which the fixed side disk portion is brought into contact with the fixed side power feeding plate, and in which the fixed side strut portion is fixed to a fixed side energization rod, is included;

a fixed side cavity is formed between the fixed side contact back spot facing portion and the fixed side circular arc shaped power feeding portion;

a fixed side power feeding plate float portion is formed as a cutout in a rear surface of the fixed side circular arc shaped power feeding portion of the fixed side power feeding plate, and a fixed side float portion air gap is formed between the fixed side power feeding plate float portion and the fixed side circular arc shaped coil portion; and wherein when the power feeding plate and the coil electrode are provided on the movable side electrode, the movable side electrode includes: a movable side contact which is formed in a disk shape and is formed with a movable side contact back spot facing portion on a back surface, a movable side power feeding plate which is fixed to an inner surface of the movable side contact back spot facing portion of the movable side contact and has a movable side circular arc shaped power feeding portion formed on an outer circumference of a disk shaped movable side disk portion along an outer circumferential edge, and a movable side coil electrode in which a movable side circular arc shaped coil portion along an outer circumferential edge of the movable side contact is arranged being divided in plurality by a movable side slit on a rear surface side of the movable side power feeding plate;

a movable side reinforcing member, which has a movable side disk portion and a movable side strut portion, in which the movable side disk portion is brought into contact with the movable side power feeding plate, and in which the movable side strut portion is fixed to a movable side energization rod, is included;

a movable side cavity is formed between the movable side contact back spot facing portion and the movable side circular arc shaped power feeding portion;

a movable side power feeding plate float portion is formed as a cutout in a rear surface of the movable side circular arc shaped power feeding portion of the movable side power feeding plate, and a movable side float portion air gap is formed between the movable side power feeding plate float portion and the movable side circular arc shaped coil portion.

9. The vacuum interrupter according to claim 8, wherein a diameter of the fixed side disk portion of the fixed side power feeding plate is less than an inner diameter of the fixed side circular arc shaped coil portion of the fixed side coil electrode, or a diameter of the movable side disk portion of the movable side power feeding plate is less than an inner diameter of the movable side circular arc shaped coil portion of the movable side coil electrode.

10. The vacuum interrupter according to claim 8, wherein a fixed side power feeding plate spot facing portion is formed on the back surface of the fixed side disk portion of the fixed side power feeding plate and the fixed side disk portion of the fixed side reinforcing member is brought into contact with the fixed side power feeding plate spot facing portion, or a movable side power feeding plate spot facing portion is formed on the back surface of the movable side disk portion of the movable side power feeding plate and the movable side disk portion of the movable side reinforcing member is brought into contact with the movable side power feeding plate spot facing portion.

11. The vacuum interrupter according to claim 8, wherein a circular fixed side through hole is formed in the fixed side disk portion of the fixed side power feeding plate and the fixed side disk portion of the fixed side reinforcing member is inserted through the fixed side through hole and is arranged on the fixed side contact back spot facing portion, or a circular movable side through hole is formed in the movable side disk portion of the movable side power feeding plate and the movable side disk portion of the movable side reinforcing member is inserted through the movable side through hole and is arranged on the movable side contact back spot facing portion.

12. The vacuum interrupter according to claim 8, wherein a fixed side power feeding plate slit that is led to one end of the fixed side circular arc shaped power feeding portion of the fixed side power feeding plate is formed in the fixed side disk portion of the fixed side power feeding plate, or a movable side power feeding plate slit that is led to one end of the movable side circular arc shaped power feeding portion of the movable side power feeding plate is formed in the movable side disk portion of the movable side power feeding plate.

13. A vacuum interrupter comprising:

a cylindrical insulation container, a fixed side electrode arranged in an inside of the insulation container, and a movable side electrode which is arranged in the inside of the insulation container and is brought into contact with and separated from the fixed side electrode;

wherein the fixed side electrode and the movable side electrode each have a contact;

at least either the fixed side electrode or the movable side electrode includes: a power feeding plate having a circular arc shaped power feeding portion formed on an outer circumference of a disk portion, and a coil electrode in which a circular arc shaped coil portion along an outer circumferential edge of the contact is arranged being divided in plurality by a slit on a rear surface side of the power feeding plate and in which a circular arc protrusion portion whose circumferential length is shorter than a circumferential length of a circular arc shaped portion of the circular arc shaped power feeding portion is fixed at a position of the circular arc shaped coil portion, the position being faced to the circular arc shaped power feeding portion; and a cavity is formed between the contact and the circular arc shaped power feeding portion, a circular arc shaped first groove portion is formed on a termination end portion of the circular arc shaped coil portion of the coil electrode, a circular arc shaped second groove portion that is deeper than a depth of the circular arc shaped first groove portion is formed on a beginning end portion of the circular arc shaped coil portion of the coil electrode which sandwiches a slit, the circular arc shaped power feeding portion of the power feeding plate is arranged over the circular arc shaped first groove portion and the circular arc shaped second groove portion, the circular arc shaped power feeding portion of the power feeding plate is fixed to the circular arc shaped first groove portion, and a groove portion air gap is formed between the circular arc shaped power feeding portion of the power feeding plate and the circular arc shaped second groove portion.

14. The vacuum interrupter according to claim 13, wherein the fixed side electrode includes: a fixed side contact which is formed in a disk shape and is formed with a fixed side contact back spot facing portion on a back surface, a fixed side power feeding plate which is fixed to an inner surface of the fixed side contact back spot facing portion of the fixed side contact and has a fixed side circular arc shaped power feeding portion on the outer circumference of a disk shaped fixed side disk portion, and a fixed side coil electrode in which a fixed side circular arc shaped coil portion along an outer circumferential edge of the fixed side contact is arranged being divided in plurality by a fixed side slit on the rear surface side of the fixed side power feeding plate;

the movable side electrode includes: a movable side contact which is formed in a disk shape and is formed with a movable side contact back spot facing portion on a back surface, a movable side power feeding plate which is fixed to an inner surface of the movable side contact back spot facing portion of the movable side contact and has a movable side circular arc shaped power feeding portion on the outer circumference of a disk shaped movable side disk portion, and a movable side coil electrode in which a movable side circular arc shaped coil portion along an outer circumferential edge of the movable side contact is arranged being divided in plurality by a movable side slit on the rear surface side of the movable side power feeding plate;

a fixed side reinforcing member, which has a fixed side disk portion and a fixed side strut portion, in which the fixed side disk portion is brought into contact with the fixed side power feeding plate, and in which the fixed side strut portion is fixed to a fixed side energization rod, is included;

a movable side reinforcing member, which has a movable side disk portion and a movable side strut portion, in which the movable side disk portion is brought into contact with the movable side power feeding plate, and in which the movable side strut portion is fixed to a movable side energization rod, is included;

a fixed side cavity is formed between the fixed side contact back spot facing portion and the fixed side circular arc shaped power feeding portion, and a movable side cavity is formed between the movable side contact back spot facing portion and the movable side circular arc shaped power feeding portion;

a fixed side circular arc shaped first groove portion is formed on a termination end portion of the fixed side circular arc shaped coil portion of the fixed side coil electrode, a fixed side circular arc shaped second groove portion that is deeper than a depth of the fixed side circular arc shaped first groove portion is formed on a beginning end portion of the fixed side circular arc shaped coil portion of the fixed side coil electrode which sandwiches the fixed side slit, the fixed side circular arc shaped power feeding portion of the fixed side power feeding plate is arranged over the fixed side circular arc shaped first groove portion and the fixed side circular arc shaped second groove portion, the fixed side circular arc shaped power feeding portion of the fixed side power feeding plate is fixed to the fixed side circular arc shaped first groove portion, and a fixed side groove portion air gap is formed between the fixed side circular arc shaped power feeding portion of the fixed side power feeding plate and the fixed side circular arc shaped second groove portion; and a movable side circular arc shaped first groove portion is formed on a termination end portion of the movable side circular arc shaped coil portion of the movable side coil electrode, a movable side circular arc shaped second groove portion that is deeper than a depth of the movable side circular arc shaped first groove portion is formed on a beginning end portion of the movable side circular arc shaped coil portion of the movable side coil electrode which sandwiches the movable side slit, the movable side circular arc shaped power feeding portion of the movable side power feeding plate is arranged over the movable side circular arc shaped first groove portion and the movable side circular arc shaped second groove portion, the movable side circular arc shaped power feeding portion of the movable side power feeding plate is fixed to the movable side circular arc shaped first groove portion, and a movable side groove portion air gap is formed between the movable side circular arc shaped power feeding portion of the movable side power feeding plate and the movable side circular arc shaped second groove portion.

15. The vacuum interrupter according to claim 14, wherein an outer diameter of the fixed side circular arc shaped power feeding portion of the fixed side power feeding plate is less than or equal to an outer diameter of the fixed side circular arc shaped first groove portion, which is less than an outer diameter of the fixed side circular arc shaped second groove portion, or an outer diameter of the movable side circular arc shaped power feeding portion of the movable side power feeding plate is less than or equal to an outer diameter of the movable side circular arc shaped first groove portion, which is less than an outer diameter of the movable side circular arc shaped second groove portion.

16. The vacuum interrupter according to claim 15,
wherein when the fixed side circular arc shaped power feeding portion of the fixed side power feeding plate is fixed to the fixed side circular arc shaped first groove portion of the fixed side circular arc shaped coil portion of the fixed side coil electrode, the fixed side circular arc shaped power feeding portion of the fixed side power feeding plate is set to a groove width that is to be out of contact with the fixed side circular arc shaped second groove portion of the fixed side circular arc shaped coil portion of the fixed side coil electrode; and when the movable side circular arc shaped power feeding portion of the movable side power feeding plate is fixed to the movable side circular arc shaped first groove portion of the movable side circular arc shaped coil portion of the movable side coil electrode, the movable side circular arc shaped power feeding portion of the movable side power feeding plate is set to a groove width that is to be out of contact with the movable side circular arc shaped second groove portion of the movable side circular arc shaped coil portion of the movable side coil electrode.

17. The vacuum interrupter according to claim 14,
wherein when the fixed side circular arc shaped power feeding portion of the fixed side power feeding plate is fixed to the fixed side circular arc shaped first groove portion of the fixed side circular arc shaped coil portion of the fixed side coil electrode, the fixed side circular arc shaped power feeding portion of the fixed side power feeding plate is set to a groove width that is to be out of contact with the fixed side circular arc shaped second groove portion of the fixed side circular arc shaped coil portion of the fixed side coil electrode; and when the movable side circular arc shaped power feeding portion of the movable side power feeding plate is fixed to the movable side circular arc shaped first groove portion of the movable side circular arc shaped coil portion of the movable side coil electrode, the movable side circular arc shaped power feeding portion of the movable side power feeding plate is set to a groove width that is to be out of contact with the movable side circular arc shaped second groove portion of the movable side circular arc shaped coil portion of the movable side coil electrode.

18. The vacuum interrupter according to claim 13,
wherein a fixed side power feeding plate spot facing portion is formed on the back surface of the fixed side disk portion of the fixed side power feeding plate and the fixed side disk portion of the fixed side reinforcing member is brought into contact with the fixed side power feeding plate spot facing portion, or a movable side power feeding plate spot facing portion is formed on the back surface of the movable side disk portion of the movable side power feeding plate and the movable side disk portion of the movable side reinforcing member is brought into contact with the movable side power feeding plate spot facing portion.

19. The vacuum interrupter according to claim 13,
wherein a circular fixed side through hole is formed in the fixed side disk portion of the fixed side power feeding plate and the fixed side disk portion of the fixed side reinforcing member is inserted through the fixed side through hole and is arranged on the fixed side contact back spot facing portion, or a circular movable side through hole is formed in the movable side disk portion of the movable side power feeding plate and the movable side disk portion of the movable side reinforcing member is inserted through the movable side through hole and is arranged on the movable side contact back spot facing portion.

20. The vacuum interrupter according to claim 13,
wherein a fixed side power feeding plate slit that is led to one end of the fixed side circular arc shaped power feeding portion of the fixed side power feeding plate is formed in the fixed side disk portion of the fixed side power feeding plate, or a movable side power feeding plate slit that is led to one end of the movable side circular arc shaped power feeding portion of the movable side power feeding plate is formed in the movable side disk portion of the movable side power feeding plate.

* * * * *